United States Patent
Jiang et al.

(10) Patent No.: US 11,606,804 B2
(45) Date of Patent: Mar. 14, 2023

(54) METHOD AND APPARATUS FOR TRANSMITTING SCHEDULING REQUEST

(71) Applicant: Beijing Xiaomi Mobile Software Co., Ltd., Beijing (CN)

(72) Inventors: Xiaowei Jiang, Beijing (CN); Qun Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 74 days.

(21) Appl. No.: 17/039,019

(22) Filed: Sep. 30, 2020

(65) Prior Publication Data
US 2021/0014880 A1 Jan. 14, 2021

Related U.S. Application Data

(63) Continuation of application No. PCT/CN2018/082005, filed on Apr. 4, 2018.

(51) Int. Cl.
*H04W 72/12* (2009.01)
*H04W 24/08* (2009.01)
*H04W 24/10* (2009.01)
*H04W 72/04* (2009.01)
(Continued)

(52) U.S. Cl.
CPC ....... *H04W 72/1268* (2013.01); *H04W 24/08* (2013.01); *H04W 24/10* (2013.01); *H04W 72/0446* (2013.01); *H04W 72/1242* (2013.01); *H04W 72/1284* (2013.01)

(58) Field of Classification Search
CPC ......... H04W 72/1268; H04W 72/0446; H04W 72/1242; H04W 72/1284; H04W 24/08; H04W 24/10
See application file for complete search history.

(56) References Cited

U.S. PATENT DOCUMENTS

| 2011/0092201 A1* | 4/2011 | Lindstrom ............ H04W 24/10 455/424 |
| 2015/0271809 A1 | 9/2015 | Kato et al. |
| 2018/0014323 A1 | 1/2018 | Huang et al. |

(Continued)

FOREIGN PATENT DOCUMENTS

| CN | 102084682 A | 6/2011 |
| CN | 104093212 A | 10/2014 |

(Continued)

OTHER PUBLICATIONS

Notice of Reasons for Refusal for Japanese Application No. 2020-554241, dated Nov. 19, 2021.

(Continued)

*Primary Examiner* — Robert C Scheibel
(74) *Attorney, Agent, or Firm* — Finnegan, Henderson, Farabow, Garrett & Dunner, L.L.P.

(57) ABSTRACT

A method of transmitting a scheduling request, applied to user equipment, includes: determining whether there is an overlap in time-domain between a physical uplink control channel transmission for a scheduling request corresponding to a first logical channel and a second operation of the user equipment; and transmitting, in response to that there is the overlap, the scheduling request corresponding to the first logical channel through the physical uplink control channel and suspending the second operation.

11 Claims, 17 Drawing Sheets

(51) Int. Cl.
*H04W 72/1268* (2023.01)
*H04W 72/0446* (2023.01)

(56) References Cited

U.S. PATENT DOCUMENTS

| | | | | |
|---|---|---|---|---|
| 2019/0230683 A1* | 7/2019 | Akkarakaran | ........ | H04L 5/0053 |
| 2019/0261391 A1* | 8/2019 | Kundu | .............. | H04W 72/0446 |
| 2020/0008227 A1* | 1/2020 | Lee | ........................ | H04L 5/0055 |
| 2020/0196327 A1* | 6/2020 | Zhang | .................. | H04B 7/0617 |
| 2020/0281012 A1* | 9/2020 | Behravan | .......... | H04W 72/1268 |
| 2020/0367265 A1* | 11/2020 | Wang | .................... | H04W 76/27 |

FOREIGN PATENT DOCUMENTS

| | | |
|---|---|---|
| CN | 104661316 A | 5/2015 |
| CN | 106160977 A | 11/2016 |
| RU | 2619063 C2 | 5/2017 |
| WO | WO 2017/195769 A1 | 11/2017 |

OTHER PUBLICATIONS

Examination Report for Indian Application No. 202047047303, dated Dec. 6, 2021.
Huawei, HiSilicon, "SR procedure in NR", 3GPP TSG-RAN2 Meeting #99bis, R2-1710109, Prague, Czech Republic, Oct. 9-13, 2017, 7 pages.
Nokia, "Email discussion summary on [99bis#38][NR UP/MAC]—SR open issues", 3GPP TSG-RAN WG2 #100, R2-1712973, Reno, USA, Nov. 27-Dec. 1, 2017, 55 pages.
Ericsson, "Handling collisions of sTTI and TTI in UL", 3GPP TSG-RAN WG1 Meeting #90, R1-1712893, Prague, Czech Republic, Aug. 21-25, 2017, 8 pages.
Intel Corporation, "Remaining aspects related to interaction between different TTI lengths", 3GPP TSG-RAN WG1 #91, R1-1720022, Reno, Nevada, USA, Nov. 27-Dec. 1, 2017, 5 pages.
State Intellectual Property Office of the People's Republic of China, Office Action and Search Report Issued in Application No. 201880000377.3, dated Oct. 19, 2020, 12 pages.
ISA State Intellectual Property Office of the People's Republic of China, International Search Report Issued in Application No. PCT/CN2018/082005, dated Jan. 2, 2019, WIPO, 4 pages.
Nokia, Nokia Shanghai Bell, Remaining open items on short PUCCH, 3GPP TSG RAN WG1 Meeting #92, Athens, Greece, R1-1802023, Feb. 26-Mar. 2, 2018, 3 pages.
European Patent Office, Extended European Search Report Issued in Application No. 18913239.2, dated Feb. 18, 2021, 7 pages.
State Intellectual Property Office of the People's Republic of China, Second Office Action Issued in Application No. 201880000377.3, dated Feb. 24, 2021, 8 pages.
ISA State Intellectual Property Office of the People's Republic of China, Written Opinion of the International Searching Authority Issued in Application No. PCT/CN2018/082005, dated Jan. 2, 2019, WIPO, 8 pages.
Huawei, HiSilicon, "SR procedure in NR", 3GPP TSG-RAN2 Meeting #99bis, R2-1710109, Revision of R2-1708266, Prague, Czech Republic, Oct. 9-13, 2017, 6 pages.
European Patent Office, Office Action issued in Application No. 18913239.2, dated Apr. 21, 2022.
Notification of Reason for Refusal of Korean Application No. 10-2020-7031740, dated Mar. 14, 2022.

* cited by examiner

METHOD AND APPARATUS FOR TRANSMITTING SCHEDULING REQUEST

CROSS-REFERENCE TO RELATED APPLICATION

This application is a continuation application of International Application No. PCT/CN2018/082005, filed on Apr. 4, 2018, the disclosure of which is incorporated herein by reference in its entirety.

TECHNICAL FIELD

The present disclosure relates to the field of communication technology, and in particular, relates to methods and apparatuses for transmitting a scheduling request, an electronic device, and a computer-readable storage medium.

BACKGROUND

When user equipment is to transmit new uplink data, a buffer status report (BSR) is triggered. However, if there are no available uplink resources for transmitting the BSR, a scheduling request (SR) may be triggered and transmitted to a base station through a physical uplink control channel (PUCCH) resource to request the uplink resources.

The user equipment also transmits data to the base station through an uplink shared channel (UL-SCH) resource. Moreover, the user equipment in a current serving cell keeps monitoring the frequencies of other cell(s) for a period of time, also referred to as a measurement gap.

In related art, when the PUCCH resource for transmitting the SR overlaps in time-domain with the UL-SCH resource for transmitting data or with the measurement gap, the SR is not transmitted through the PUCCH resource until data has been transmitted through the UL-SCH resource, or until the measurement gap is over.

In some cases, the SR is triggered by a service requiring a low delay. However, according to the way of transmitting the SR in the related art, since the SR is not transmitted through the PUCCH resource until data has been transmitted through the UL-SCH resource or until the measurement gap is over, it takes a long time from triggering the SR to transmitting the SR, and thus cannot meet the delay requirement of the service that triggers the SR.

SUMMARY

According to a first aspect of embodiments of the present disclosure, a method of transmitting a scheduling request, applied to user equipment, includes: determining whether there is an overlap in time-domain between a physical uplink control channel transmission for a scheduling request corresponding to a first logical channel and a second operation of the user equipment; and transmitting, in response to that there is the overlap, the scheduling request corresponding to the first logical channel through a physical uplink control channel and suspending the second operation.

According to a second aspect of embodiments of the present disclosure, a method of transmitting a scheduling request, applied to user equipment, includes: determining whether a physical uplink control channel (PUCCH) resource for transmitting a scheduling request by the user equipment overlaps with an uplink shared channel (UL-SCH) resource; and performing, in response to that the PUCCH resource for transmitting the scheduling request by the user equipment overlaps with the UL-SCH resource, a PUCCH transmission for the scheduling request or an overlapped UL-SCH transmission.

According to a third aspect of embodiments of the present disclosure, a method of transmitting a scheduling request, applied to user equipment, includes: determining whether a physical uplink control channel (PUCCH) resource for transmitting a scheduling request by the user equipment overlaps with an uplink shared channel (UL-SCH) resource; and de-prioritizing, in response to that the PUCCH resource for transmitting the scheduling request by the user equipment overlaps with the UL-SCH resource, a PUCCH transmission for the scheduling request or an overlapped UL-SCH transmission.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION OF THE EMBODIMENTS

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
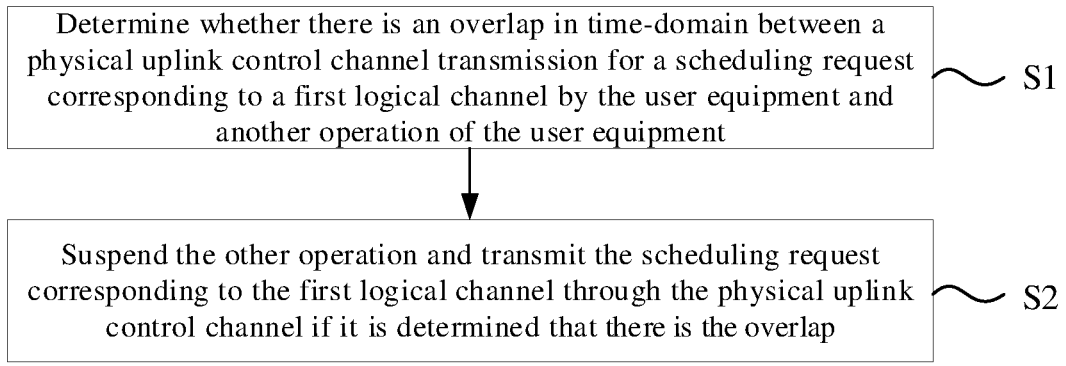
FIG. 1 is a flowchart illustrating a method of transmitting a scheduling request according to an embodiment.

FIG. 1 is a flowchart illustrating a method of transmitting a scheduling request according to an embodiment. The method of transmitting a scheduling request is applicable to user equipment, such as a mobile phone, a tablet computer, and the like, configured for LTE communication or NR communication.

As shown in FIG. 1, the method of transmitting a scheduling request may include the following steps.

At step S1, it is determined whether there is an overlap in time-domain between a physical uplink control channel transmission for a scheduling request corresponding to a first logical channel by the user equipment and another operation of the user equipment.

In an embodiment, the first logical channel may be any logical channel. Moreover, the first logical channel may be correlated with a certain service and transmit data and signaling of its corresponding service. For transmitting data of the service corresponding to the first logical channel to a base station, the user equipment may trigger a BSR. When there are no available uplink resources for transmitting the BSR, an SR, i.e., a scheduling request, may be triggered as the scheduling request corresponding to the first logical channel.

In one embodiment, after triggering the scheduling request, the user equipment may transmit the scheduling request to the base station through the physical uplink control channel (PUCCH). However, there may be an overlap in time-domain between an operation of the physical uplink control channel transmission for the scheduling request and the other operation of the user equipment. Furthermore, the user equipment may determine whether there is an overlap in time-domain between the physical uplink control channel transmission for the scheduling request corresponding to the first logical channel by the user equipment and the other operation of the user equipment.

For example, the user equipment may determine a first transmission opportunity available for transmitting the scheduling request through the physical uplink control channel after the current moment, and determine a time period for performing the other operation. Then, the user equipment may determine whether there is an overlap between the first transmission opportunity and the time period for performing the other operation.

In some embodiments, there may be one or more first transmission opportunities, and one or more time periods for performing the other operation.

For example, if there are multiple first transmission opportunities and multiple time periods for performing the other operation within a preset duration after the current moment, it may be determined whether there is an overlap in time-domain between the physical uplink control channel transmission for the scheduling request corresponding to the first logical channel and the other operation of the user equipment according to the situation that all of a first number of first transmission opportunities overlap with a second number of time periods for performing the other operation; or it may also be determined whether there is an overlap in time-domain between the physical uplink control channel transmission for the scheduling request corresponding to the first logical channel and the other operation of the user equipment according to the situation that all of the first transmission opportunities within the preset duration overlap with the time periods for performing the other operation. The specific way to determine an overlap may be set as required.

It should be noted that a situation that all the first transmission opportunities overlap with the time periods for performing the other operation, may include a situation that a part of the first transmission opportunities are contained by one or more time periods for performing the other operation in time-domain, and may also include a situation that a part of the first transmission opportunities overlap partly with one or more time periods for performing the other operation in time-domain.

At step S2, if it is determined that there is the overlap, the other operation is suspended, and the scheduling request corresponding to the first logical channel is transmitted through the physical uplink control channel.

In an embodiment, when the user equipment determines that there is the overlap in time-domain between the physical uplink control channel transmission for the scheduling request corresponding to the first logical channel and the other operation, the other operation may be suspended and the scheduling request corresponding to the first logical channel may be transmitted through the physical uplink control channel, so that uplink resources requested by the scheduling request can be obtained as soon as possible to transmit a buffer status report, thereby ensuring a lower delay required by a service corresponding to the first logical channel.

Figure 2:
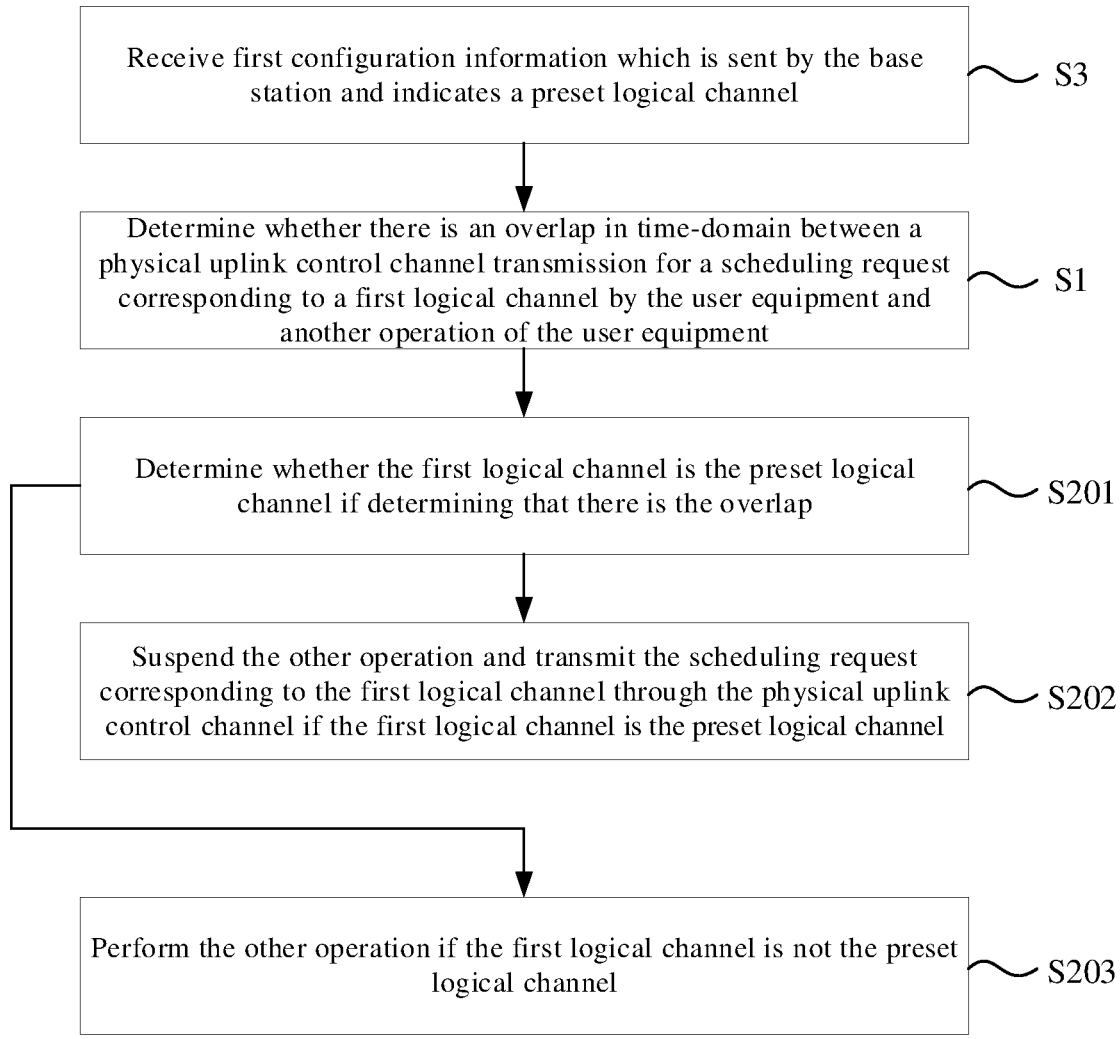
FIG. 2 is a flowchart illustrating another method of transmitting a scheduling request according to an embodiment.

FIG. 2 is a flowchart illustrating another method of transmitting a scheduling request according to an embodiment. As shown in FIG. 2, on the basis of the embodiment shown in FIG. 1, the method further includes the following steps.

At step S3, before determining whether there is an overlap in time-domain between the physical uplink control channel transmission for the scheduling request corresponding to the first logical channel by the user equipment and the other operation of the user equipment, first configuration information sent by the base station is received. The first configuration information indicates a preset logical channel.

Accordingly, the step that the other operation is suspended and the scheduling request corresponding to the first logical channel is transmitted through the physical uplink control channel if it is determined that there is the overlap, includes the following steps.

At step S201, if determining that there is the overlap, it is determined whether the first logical channel is the preset logical channel.

At step S202, if the first logical channel is the preset logical channel, the other operation is suspended and the scheduling request corresponding to the first logical channel is transmitted through the physical uplink control channel.

At step S203, if the first logical channel is not the preset logical channel, the other operation is performed.

In an embodiment, the first configuration information may be sent from the base station to the user equipment, so as to instruct the user equipment to transmit the scheduling request corresponding to the first logical channel through the physical uplink control channel only when the first logical channel is the preset logical channel, to suspend the other operation and transmit the scheduling request corresponding to the first logical channel through the physical uplink control channel when, further, there is the overlap in time-domain with the other operation, and to keep performing the other operation if the first logical channel is not the preset logical channel.

Figure 3:
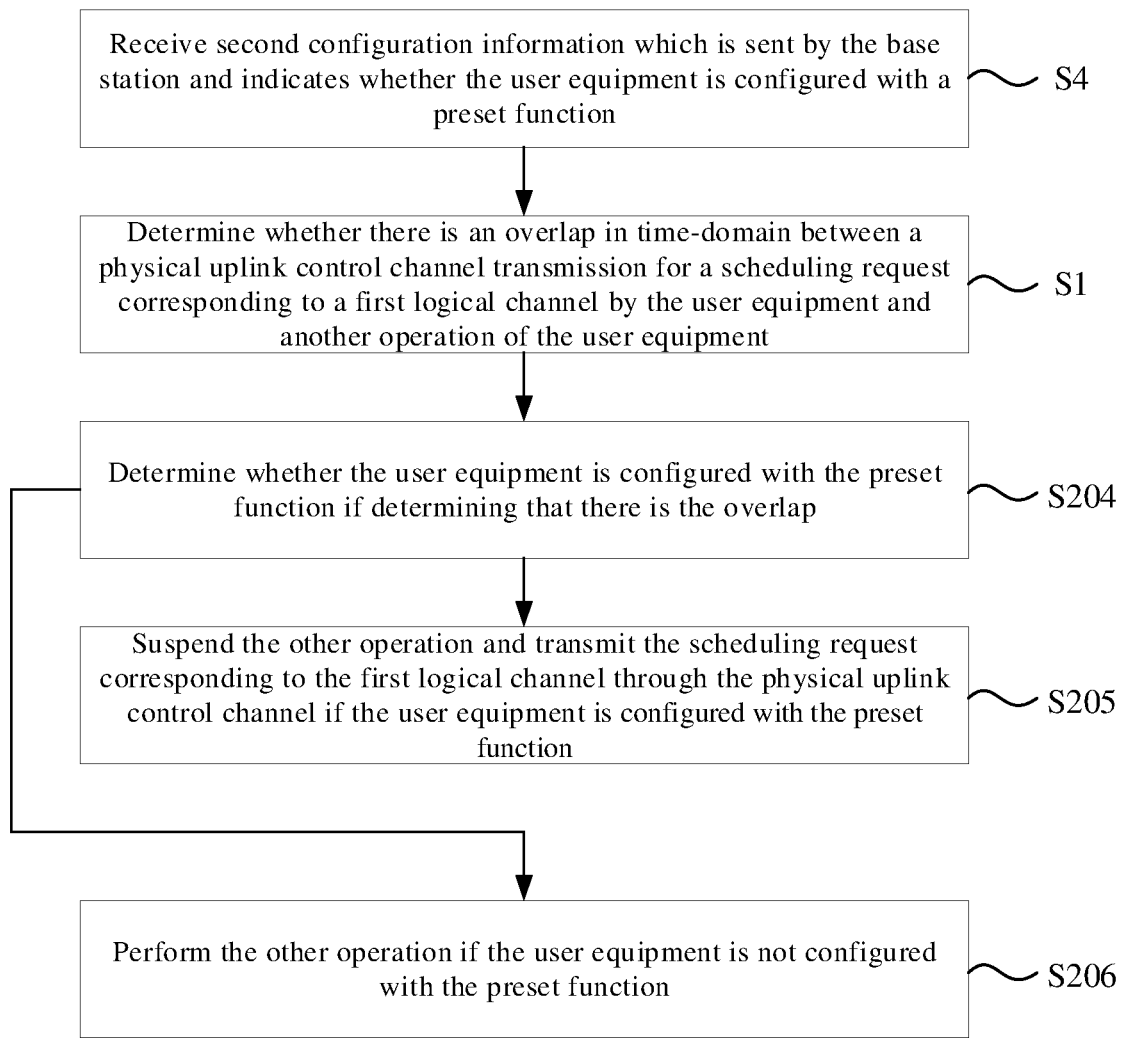
FIG. 3 is a flowchart illustrating another method of transmitting a scheduling request according to an embodiment.

FIG. 3 is a flowchart illustrating another method of transmitting a scheduling request according to an embodiment. As shown in FIG. 3, on the basis of the embodiment shown in FIG. 1, the method further includes the following steps.

At step S4, before determining whether there is an overlap in time-domain between the physical uplink control channel transmission for the scheduling request corresponding to the first logical channel by the user equipment and the other operation of the user equipment, second configuration information sent by the base station is received. The second configuration information indicates whether the user equipment is configured with a preset function.

Accordingly, the step that the other operation is suspended and the scheduling request corresponding to the first logical channel is transmitted through the physical uplink control channel if it is determined that there is the overlap, includes the following steps.

At step S204, if determining that there is the overlap, it is determined whether the user equipment is configured with the preset function.

At step S205, if the user equipment is configured with the preset function, the other operation is suspended and the scheduling request corresponding to the first logical channel is transmitted through the physical uplink control channel.

At step S206, if the user equipment is not configured with the preset function, the other operation is performed.

In an embodiment, the second configuration information may be sent from the base station to the user equipment, so as to instruct the user equipment to transmit the scheduling request corresponding to the first logical channel through the physical uplink control channel only when the user equipment is configured with the preset function, to suspend the other operation and transmit the scheduling request corresponding to the first logical channel through the physical uplink control channel when, further, there is the overlap in time-domain with the other operation, and to keep performing the other operation if the preset function is not configured.

For example, the preset function may be such a function: suspending the other operation and transmitting the scheduling request corresponding to the first logical channel through the physical uplink control channel when there is the overlap in time-domain between the physical uplink control channel transmission for the scheduling request corresponding to the first logical channel and the other operation.

In some embodiments, the other operation includes: data transmission, corresponding to a second logical channel, that is performed through an uplink shared channel by the user equipment; and/or monitoring, by the user equipment, a frequency of another cell than a current cell during a measurement gap. For example, the measurement gap is a lasting duration of monitoring the frequency of the other cell by the user equipment every time.

In an embodiment, the base station may indicate the preset logical channel or indicate whether the user equipment is configured with the preset function when the other operation is that the user equipment performs the data transmission corresponding to the second logical channel through the uplink shared channel. The base station may also indicate the preset logical channel or indicate whether the user equipment is configured with the preset function when the other operation is that the user equipment monitors the frequency of the other cell than the current cell during the measurement gap.

In some embodiments, the second logical channel may be any logical channel but differ from the first logical channel. Moreover, the second logical channel may be correlated with a certain service and transmit data and signaling of the corresponding service.

Figure 4:
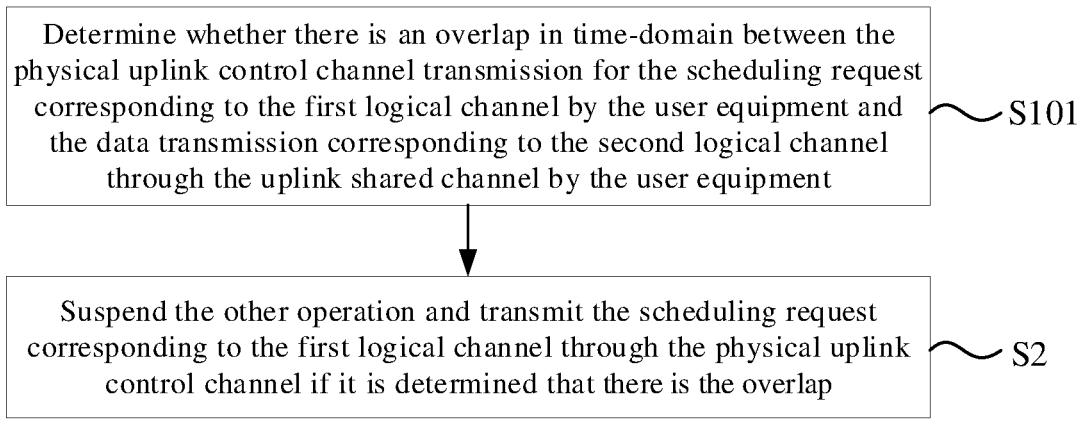
FIG. 4 is a flowchart illustrating another method of transmitting a scheduling request according to an embodiment.

FIG. 4 is a flowchart illustrating another method of transmitting a scheduling request according to an embodiment. As shown in FIG. 4, on the basis of the embodiment shown in FIG. 1, the step, that it is determined whether there is an overlap in time-domain between the physical uplink control channel transmission for the scheduling request corresponding to the first logical channel by the user equipment and the other operation of the user equipment, includes the following step.

At step S101, it is determined whether there is an overlap in time-domain between the physical uplink control channel transmission for the scheduling request corresponding to the first logical channel by the user equipment and the data transmission corresponding to the second logical channel through the uplink shared channel by the user equipment.

In an embodiment, it may be determined whether there is an overlap in time-domain between the physical uplink control channel transmission for the scheduling request corresponding to the first logical channel by the user equipment and the data transmission corresponding to the second logical channel through the uplink shared channel by the user equipment when the other operation is the data transmission corresponding to the second logical channel through the uplink shared channel by the user equipment.

Figure 5:
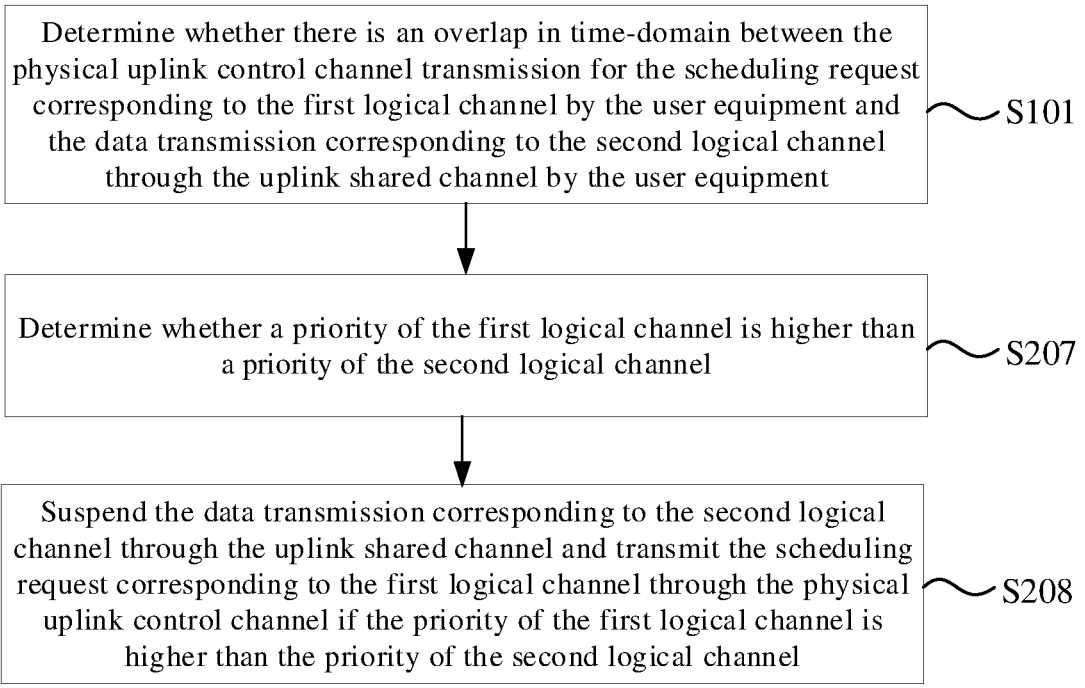
FIG. 5 is a flowchart illustrating another method of transmitting a scheduling request according to an embodiment.

FIG. 5 is a flowchart illustrating another method of transmitting a scheduling request according to an embodiment. As shown in FIG. 5, on the basis of the embodiment shown in FIG. 4, the step, that the other operation is suspended and the scheduling request corresponding to the first logical channel is transmitted through the physical uplink control channel, includes the following steps.

At step S207, it is determined whether a priority of the first logical channel is higher than a priority of the second logical channel.

At step S208, if the priority of the first logical channel is higher than the priority of the second logical channel, the data transmission corresponding to the second logical channel through the uplink shared channel is suspended and the scheduling request corresponding to the first logical channel is transmitted through the physical uplink control channel.

In an embodiment, the priority of the logical channel may be set in advance. Therefore, when determining that there is the overlap in time-domain between the physical uplink control channel transmission for the scheduling request corresponding to the first logical channel and the data transmission corresponding to the second logical channel through the uplink shared channel by the user equipment, it may be further determined whether the priority of the first logical channel is higher than the priority of the second logical channel. If the priority of the first logical channel is higher than the priority of the second logical channel, the data transmission corresponding to the second logical channel through the uplink shared channel is suspended and the scheduling request corresponding to the first logical channel is transmitted through the physical uplink control channel, thereby ensuring a lower delay required by a service corresponding to the logical channel with higher priority.

In some embodiments, the priority of the first logical channel is inversely proportional to the delay required by the first service corresponding to the first logical channel; and, the priority of the second logical channel is inversely proportional to the delay required by the second service corresponding to the second logical channel.

In an embodiment, the priority of the logical channel may be set in accordance with the delay required by the service corresponding to the logical channel. For example, the first service corresponding to the first logical channel is an ultra-reliable & low-delay communication (URLLC) service requiring a lower delay, and the second service corresponding to the second logical channel is an enhance mobile broadband (eMBB) service requiring a higher delay than the URLLC service. Therefore, it may be set a higher priority for the first logical channel corresponding to the URLLC service and a lower priority for the second logical channel corresponding to the eMBB service. Thus, when there is the overlap in time-domain between the physical uplink control channel transmission for the scheduling request corresponding to the first logical channel and the data transmission corresponding to the second logical channel through the uplink shared channel, the data transmission corresponding to the second logical channel through the uplink shared channel may be suspended and the scheduling request corresponding to the first logical channel may be transmitted through the physical uplink control channel, so that uplink resources requested by the scheduling request can be obtained as soon as possible to transmit a buffer status report, which meets the lower delay requirement of the URLLC service by ensuring the lower delay from receiving to uploading the data of the URLLC service.

Figure 6:
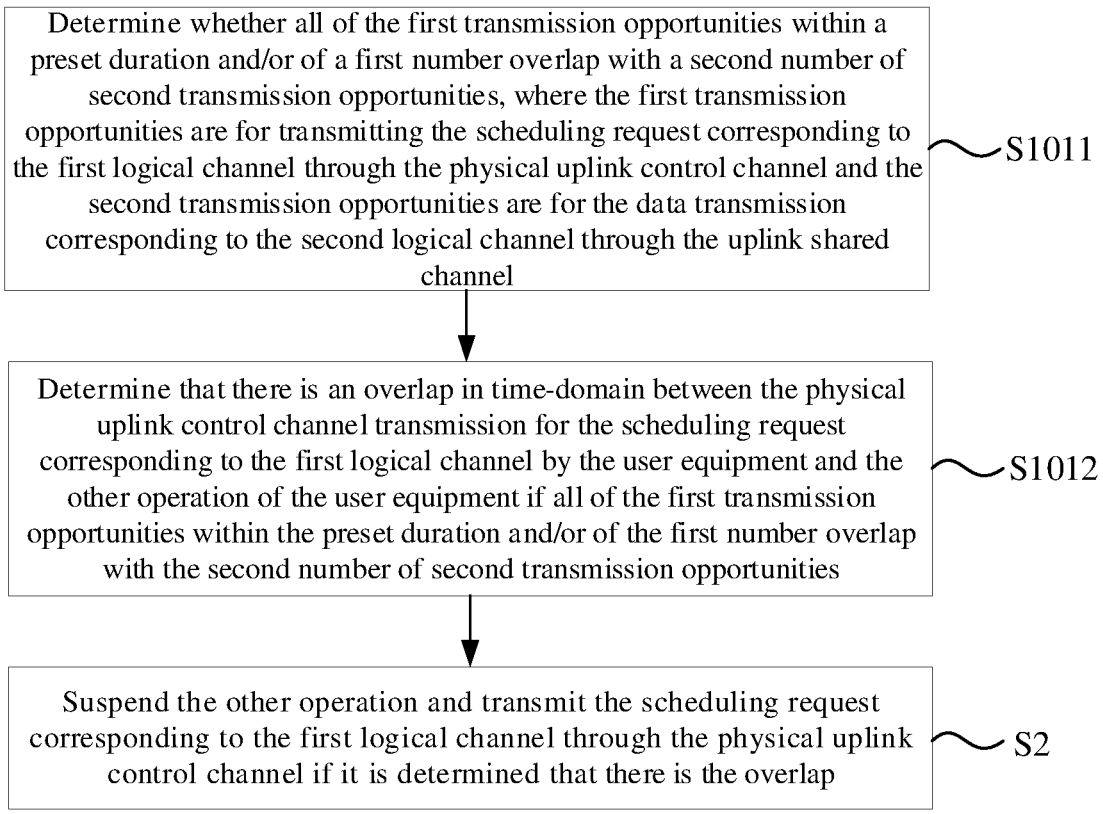
FIG. 6 is a flowchart illustrating another method of transmitting a scheduling request according to an embodiment.

FIG. 6 is a flowchart illustrating another method of transmitting a scheduling request according to an embodiment. As shown in FIG. 6, on the basis of the embodiment shown in FIG. 4, the step, that it is determined whether there is an overlap in time-domain between the physical uplink control channel transmission for the scheduling request corresponding to the first logical channel by the user equipment and the data transmission corresponding to the second logical channel through the uplink shared channel by the user equipment, includes the following steps.

At step S1011, it is determined whether all of the first transmission opportunities within a preset duration and/or of a first number overlap with a second number of second transmission opportunities, where the first transmission opportunities are for transmitting the scheduling request corresponding to the first logical channel through the physical uplink control channel and the second transmission opportunities are for the data transmission corresponding to the second logical channel through the uplink shared channel.

At step S1012, if all of the first transmission opportunities within the preset duration and/or of the first number overlap with the second number of second transmission opportunities, it is determined that there is an overlap in time-domain between the physical uplink control channel transmission for the scheduling request corresponding to the first logical channel by the user equipment and the other operation of the user equipment.

In an embodiment, there may be one or more first transmission opportunities, and one or more second transmission opportunities. Therefore, it is possible that the first transmission opportunities overlap with the second transmission opportunities in part, or that all the first transmission opportunities overlap with the second transmission opportunities.

When a part of the first transmission opportunities overlap with the second transmission opportunities, there are still some first transmission opportunities that do not overlap with the second transmission opportunities and the scheduling request may be transmitted through the physical uplink control channel at these first transmission opportunities. Therefore, in this case, the data transmission corresponding to the second logical channel through the uplink shared channel is not necessary to be suspended, which can ensure a lower delay for the service corresponding to the second logical channel at the expense of a higher delay of the service corresponding to the first logical channel to a restricted degree.

When all the first transmission opportunities overlap with the second transmission opportunities, the data transmission corresponding to the second logical channel through the uplink shared channel is to be suspended and the scheduling request corresponding to the first logical channel is transmitted through the physical uplink control channel, so as to ensure that the scheduling request can be uploaded to the base station through the physical uplink control channel.

In an embodiment, it may be determined, for the first transmission opportunities for transmitting the scheduling request corresponding to the first logical channel through the physical uplink control channel and the second transmission opportunities for the data transmission corresponding to the second logical channel through the uplink shared channel, whether all of the first transmission opportunities within the preset duration overlap with the second transmission opportunities, whether all of the first number of first transmission opportunities overlap with the second transmission opportunities, and whether all of the first number of first transmission opportunities within the preset duration overlap with the second transmission opportunities.

It should be noted that the first transmission opportunities and the second transmission opportunities may be indicated by the base station. For example, the base station may indicate the first transmission opportunities by sending uplink indication information, e.g., a UL grant, to the user equipment. In addition, the preset duration, the first number, and the second number above-mentioned may be set as required, for example, they may be set through configuration information that the base station sends to the user equipment. The first number of first transmission opportunities may means the first number of successive first transmission opportunities, and the second number of second transmission opportunities may means the second number of successive second transmission opportunities.

Figure 7:
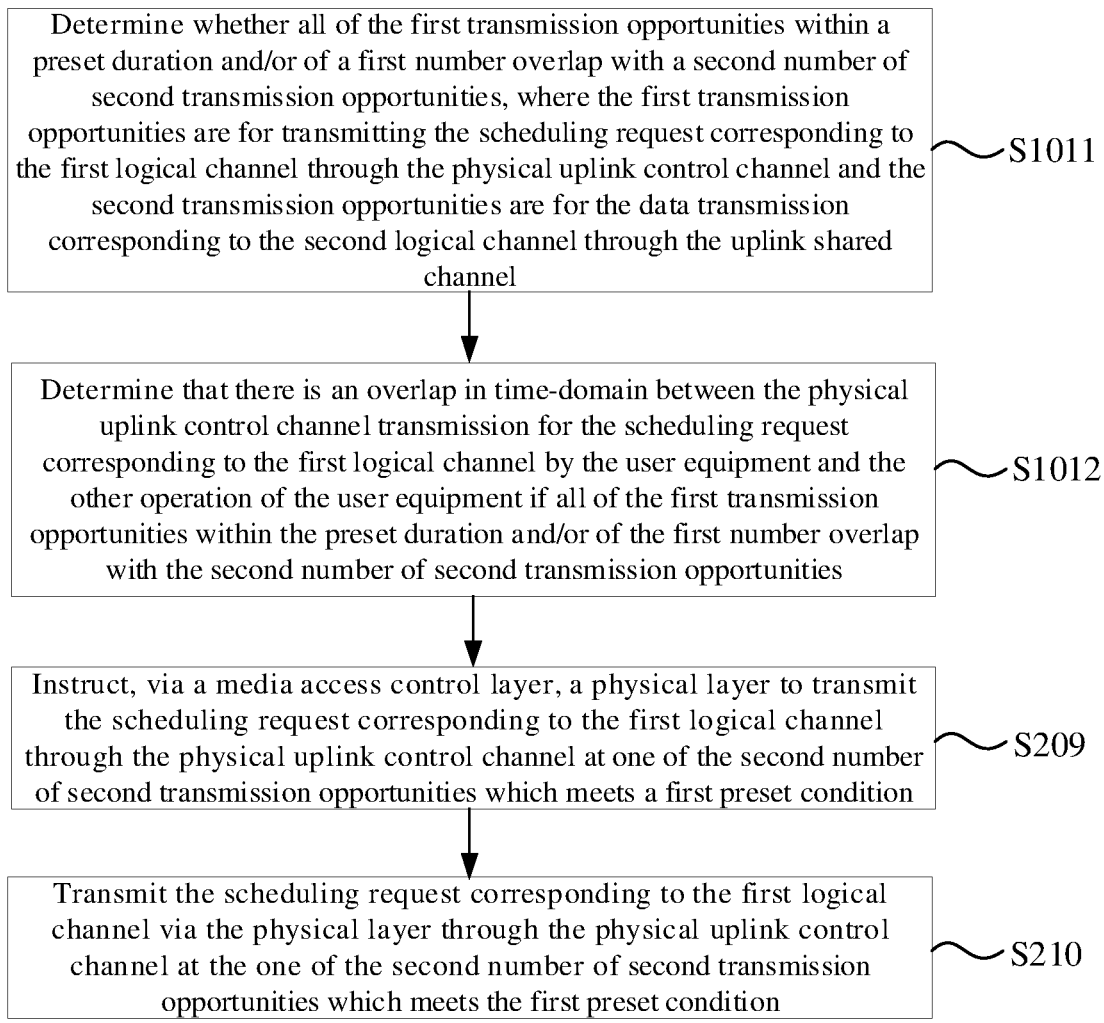
FIG. 7 is a flowchart illustrating another method of transmitting a scheduling request according to an embodiment.

FIG. 7 is a flowchart illustrating another method of transmitting a scheduling request according to an embodiment. As shown in FIG. 7, based on the embodiment shown in FIG. 6, the step, that the other operation is suspended, includes the following steps.

At step S209, a physical layer is instructed, via a media access control (MAC) layer, to transmit the scheduling request corresponding to the first logical channel through the physical uplink control channel at one of the second number of second transmission opportunities which meets a first preset condition.

At step S210, the scheduling request corresponding to the first logical channel is transmitted via the physical layer through the physical uplink control channel at the one of the second number of second transmission opportunities which meets the first preset condition.

In an embodiment, when determining that there is the overlap in time-domain between the physical uplink control channel transmission for the scheduling request corresponding to the first logical channel and the data transmission corresponding to the second logical channel through the uplink shared channel, the user equipment may indicate, via the media access control layer, the physical layer to transmit the scheduling request corresponding to the first logical channel through the physical uplink control channel at the one of the second number of second transmission opportunities which meets the first preset condition. The physical layer may transmit, based on the instruction from the media access control layer, the scheduling request corresponding to the first logical channel through the physical uplink control channel at the one of the second number of second transmission opportunities which meets the first preset condition.

It should be noted that, the media access control layer in the above case may instruct the physical layer to transmit the scheduling request corresponding to the first logical channel through the physical uplink control channel at the one of the second number of second transmission opportunities which meets the first preset condition, as well as instruct the physical layer to perform the data transmission corresponding to the second logical channel through the uplink shared channel at the second transmission opportunities. The physical layer may determine, according to the actual situation, to transmit the scheduling request corresponding to the first logical channel through the physical uplink control channel at the one of the second number of second transmission opportunities which meets the first preset condition or to perform the data transmission corresponding to the second logical channel through the uplink shared channel at the second transmission opportunities.

Figure 8:
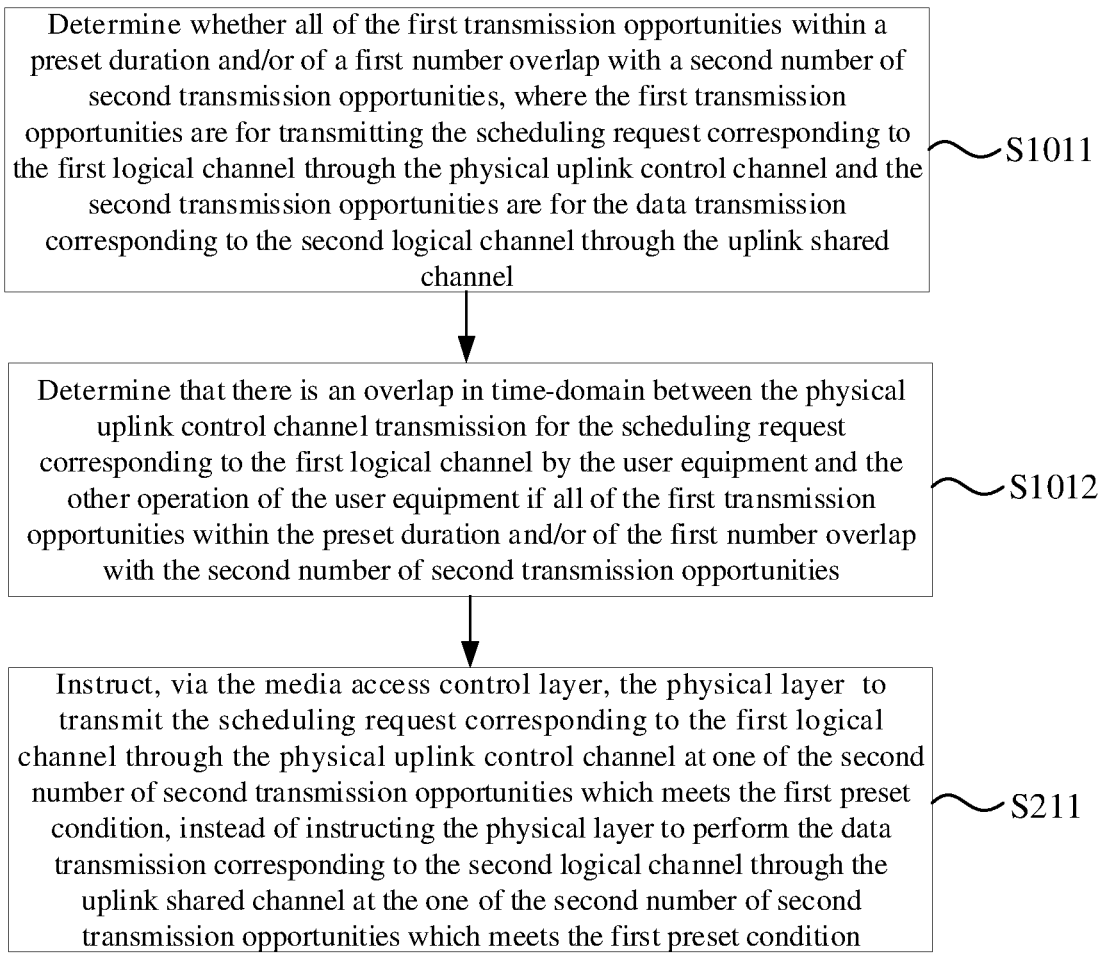
FIG. 8 is a flowchart illustrating another method of transmitting a scheduling request according to an embodiment.

FIG. 8 is a flowchart illustrating another method of transmitting a scheduling request according to an embodiment. As shown in FIG. 8, on the basis of the embodiment shown in FIG. 6, the step, that the other operation is suspended and the scheduling request corresponding to the first logical channel is transmitted through the physical uplink control channel, includes the following step.

At step S211, it is to instruct, via the media access control layer, the physical layer to transmit the scheduling request corresponding to the first logical channel through the physical uplink control channel at one of the second number of second transmission opportunities which meets the first preset condition, instead of instructing the physical layer to perform the data transmission corresponding to the second logical channel through the uplink shared channel at the one of the second number of second transmission opportunities which meets the first preset condition.

In an embodiment, when determining that there is the overlap in time-domain between the physical uplink control channel transmission for the scheduling request corresponding to the first logical channel and the data transmission corresponding to the second logical channel through the uplink shared channel, the user equipment may instruct, via the media access control layer, the physical layer to transmit the scheduling request corresponding to the first logical channel through the physical uplink control channel at the one of the second number of second transmission opportunities which meets the first preset condition, instead of instructing the physical layer to perform the data transmission corresponding to the second logical channel through the uplink shared channel at the one of the second number of second transmission opportunities which meets the first preset condition.

In this case, only the instruction, to transmit the scheduling request corresponding to the first logical channel through the physical uplink control channel at the one of the second number of second transmission opportunities which meets a first preset condition, is received from the media access control layer by the physical layer. Therefore, the scheduling request corresponding to the first logical channel may be transmitted through the physical uplink control channel at the one of the second number of second transmission opportunities which meets the first preset condition.

In some embodiments, the one of second transmission opportunities which meets the first preset condition includes: one of the second transmission opportunities which corresponds to a second logical channel with a lowest priority; or one of the second transmission opportunities which overlaps in time-domain with an earliest one of the first transmission opportunities.

In an embodiment, when multiple first transmission opportunities overlap with multiple second transmission opportunities, the scheduling request corresponding to the first logical channel may be transmitted through the physical uplink control channel at the one of multiple second transmission opportunities which meets a first preset condition.

For example, among the second transmission opportunities, the second transmission opportunity corresponding to the second logical channel with the lowest priority may be selected as the transmission opportunity for transmitting the scheduling request corresponding to the first logical channel through the physical uplink control channel. It should be noted that the second transmission opportunities may be for different logical channels, and thus different second transmission opportunities may have different priorities. Accordingly, when the scheduling request corresponding to the first logical channel is transmitted through the physical uplink control channel by occupying the second transmission opportunity, since the occupied second transmission opportunity has the lowest priority, which, for example, can tolerate the highest delay, the interference for the logical channel corresponding to the occupied second transmission opportunity is relatively small.

It is also possible to select, among the second transmission opportunities, the second transmission opportunity that overlaps in time-domain with an earliest one of the first transmission opportunities as the transmission opportunity for transmitting the scheduling request corresponding to the first logical channel through the physical uplink control channel. Accordingly, the scheduling request corresponding to the first logical channel can be transmitted through the physical uplink control channel as soon as possible, so as to ensure that the low delay required by the service corresponding to the first logical channel can be satisfied.

Figure 9:
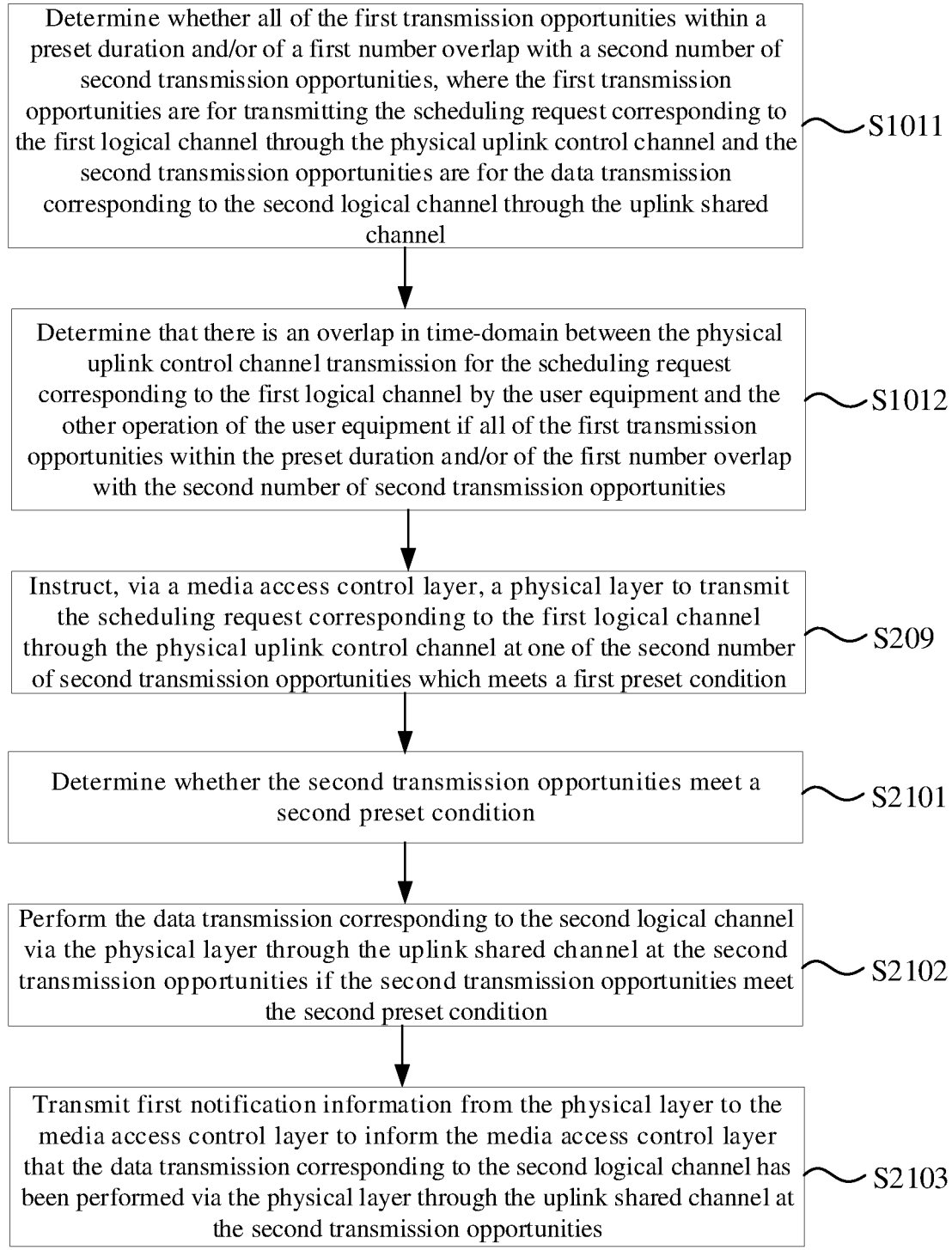
FIG. 9 is a flowchart illustrating another method of transmitting a scheduling request according to an embodiment.

FIG. 9 is a flowchart illustrating another method of transmitting a scheduling request according to an embodiment. As shown in FIG. 9, on the basis of the embodiment shown in FIG. 7, the step, that the scheduling request corresponding to the first logical channel is transmitted via the physical layer through the physical uplink control channel at the one of the second number of second transmission opportunities which meets the first preset condition, includes the following steps.

At step S2101, when determining that there is the overlap, it is determined whether the second transmission opportunities meet a second preset condition.

At step S2102, if the second transmission opportunities meet the second preset condition, the data transmission corresponding to the second logical channel is performed via the physical layer through the uplink shared channel at the second transmission opportunities.

At step S2103, first notification information is transmitted from the physical layer to the media access control layer. The first notification information informs the media access control layer that the data transmission corresponding to the second logical channel has been performed via the physical layer through the uplink shared channel at the second transmission opportunities.

In an embodiment, when the media access control layer instructs the physical layer to transmit the scheduling request corresponding to the first logical channel through the physical uplink control channel at the one of the second number of second transmission opportunities which meets the first preset condition, as well as instructs the physical layer to perform the data transmission corresponding to the second logical channel through the uplink shared channel at the second transmission opportunities, the physical layer may determine which operation to be performed according to the actual situation.

In some embodiments, it may be determined whether the second transmission opportunities meet the second preset condition, for example, whether a number of the second transmission opportunities is less than a preset number. When the second transmission opportunities meet the preset condition, it may be to perform the data transmission corresponding to the second logical channel via the physical layer through the uplink shared channel at the second transmission opportunities, instead of transmitting the scheduling request corresponding to the first logical channel through the physical uplink control channel at the one of the second number of second transmission opportunities which meets the first preset condition. Moreover, the first notification information is to be sent to the media access control layer, so that the media access control layer can determine which operation is performed via the physical layer and thus provide subsequent instructions.

In some embodiments, the second preset condition is that the number of the second transmission opportunities is equal to 1.

In an embodiment, when the number of the second transmission opportunities is equal to 1, data of the second logical channel corresponding to the second transmission opportunity cannot be uploaded if the scheduling request corresponding to the first logical channel is transmitted through the physical uplink control channel at the second transmission opportunity, which seriously affects the service of the second logical channel. Therefore, in this case, the second transmission opportunity may be utilized to perform the data transmission corresponding to the second logical channel through the uplink shared channel instead of transmitting the scheduling request corresponding to the first logical channel through the physical uplink control channel, which ensures that data of the second logical channel can be successfully uploaded.

In some embodiments, the method further includes the following step.

Before determining whether there is an overlap in time-domain between the physical uplink control channel transmission for the scheduling request corresponding to the first logical channel by the user equipment and the data transmission corresponding to the second logical channel through the uplink shared channel by the user equipment, third configuration information sent by the base station is received and the second logical channel is determined based on the third configuration information.

In an embodiment, the third configuration information may be sent from the base station to the user equipment and indicate the user equipment to transmit the scheduling request corresponding to the first logical channel through the physical uplink control channel only when the second logical channel is the preset logical channel, to suspend the other operation and transmit the scheduling request corresponding to the first logical channel through the physical uplink control channel when, further, there is the overlap in time-domain with the other operation, and to perform the other operation if the second logical channel is not the preset logical channel.

Figure 10:
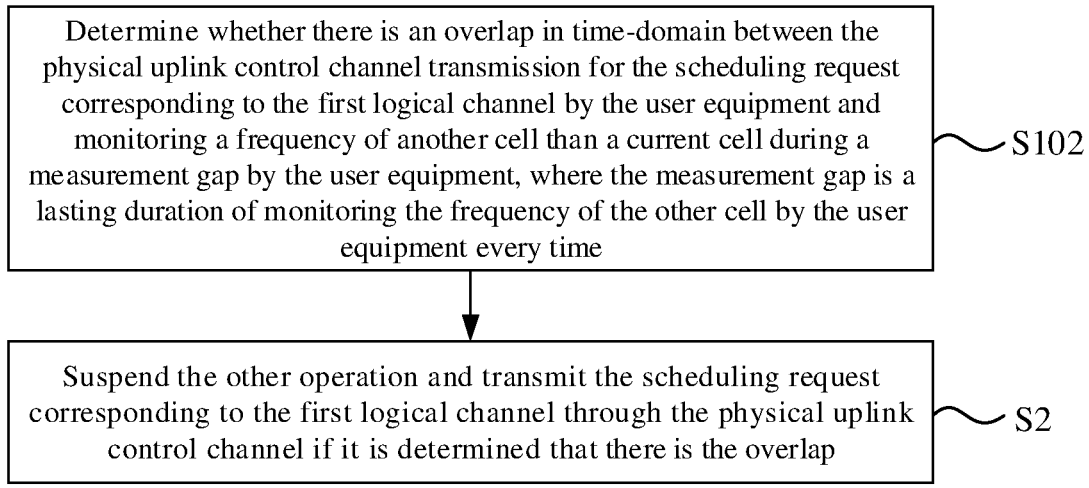
FIG. 10 is a flowchart illustrating another method of transmitting a scheduling request according to an embodiment.

FIG. 10 is a flowchart illustrating another method of transmitting a scheduling request according to an embodiment. As shown in FIG. 10, on the basis of the embodiment shown in FIG. 1, the step, that it is determined whether there is an overlap in time-domain between the physical uplink control channel transmission for the scheduling request corresponding to the first logical channel by the user equipment and the other operation of the user equipment, includes the following step.

At step S102, it is determined whether there is an overlap in time-domain between the physical uplink control channel transmission for the scheduling request corresponding to the first logical channel by the user equipment and monitoring a frequency of another cell than a current cell during a measurement gap by the user equipment. For example, the measurement gap is a lasting duration of monitoring the frequency of the other cell by the user equipment every time.

In an embodiment, when the other operation is that the user equipment monitors the frequency of the other cell than the current cell during the measurement gap, it may be determined whether there is an overlap in time-domain between the physical uplink control channel transmission for the scheduling request corresponding to the first logical channel by the user equipment and monitoring the frequency of the other cell than the current cell during the measurement gap by the user equipment.

Figure 11:
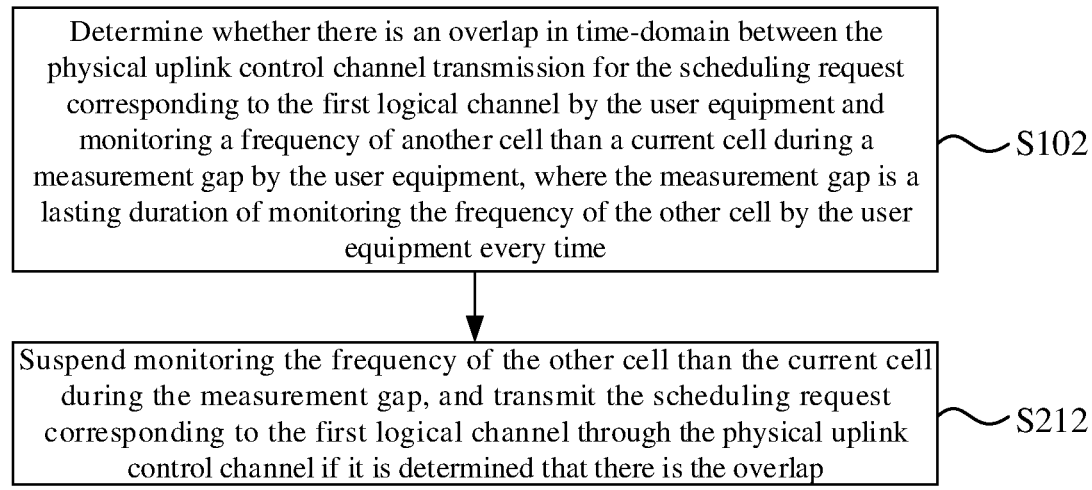
FIG. 11 is a flowchart illustrating another method of transmitting a scheduling request according to an embodiment.

FIG. 11 is a flowchart illustrating another method of transmitting a scheduling request according to an embodiment. As shown in FIG. 11, on the basis of the embodiment shown in FIG. 10, the step, that the other operation is suspended and the scheduling request corresponding to the first logical channel is transmitted through the physical uplink control channel, includes the following step.

At step S212, monitoring the frequency of the other cell than the current cell during the measurement gap is suspended, and the scheduling request corresponding to the first logical channel is transmitted through the physical uplink control channel.

In an embodiment, when the other operation is that the frequency of the other cell than the current cell is monitored during the measurement gap, if, for the measurement gap, there is the overlap in time-domain between the physical uplink control channel transmission for the scheduling request corresponding to the first logical channel and monitoring the frequency of the other cell than the current cell during the measurement gap by the user equipment, monitoring the frequency of the other cell than the current cell during the measurement gap may be suspended, and the scheduling request corresponding to the first logical channel may be transmitted through the physical uplink control channel.

Figure 12:
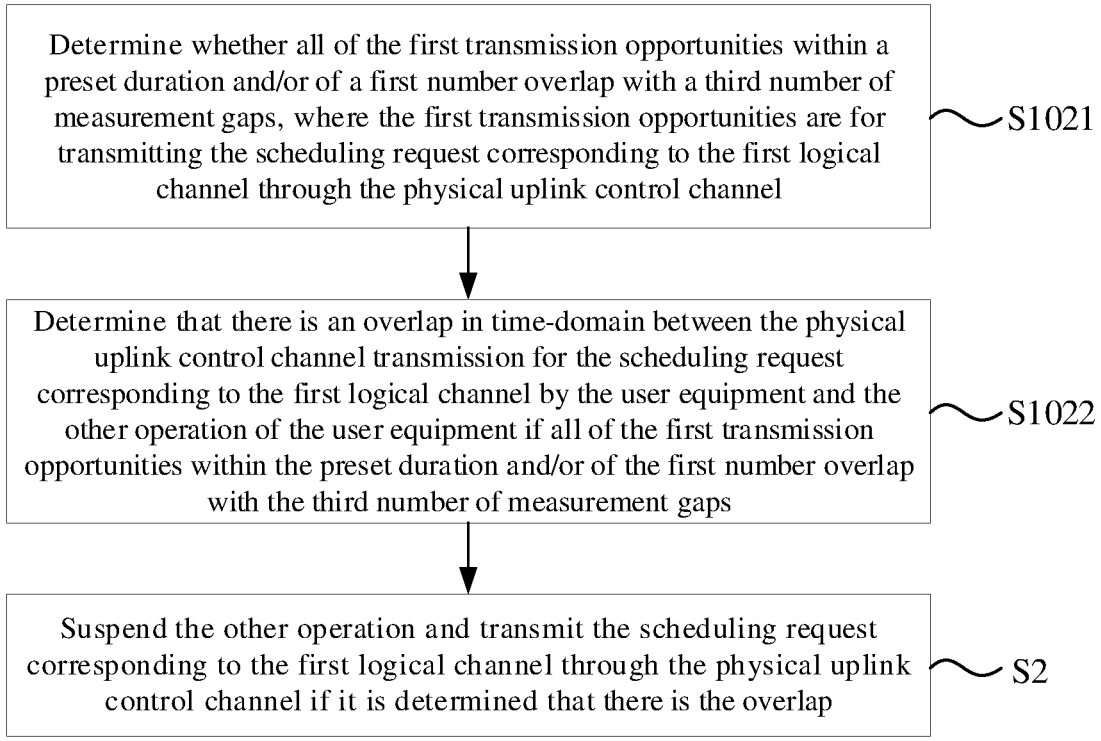
FIG. 12 is a flowchart illustrating another method of transmitting a scheduling request according to an embodiment.

FIG. 12 is a flowchart illustrating another method of transmitting a scheduling request according to an embodiment. As shown in FIG. 12, on the basis of the embodiment shown in FIG. 10, the step, that it is determined whether there is an overlap in time-domain between the physical uplink control channel transmission for the scheduling request corresponding to the first logical channel by the user equipment and monitoring the frequency of the other cell than the current cell during the measurement gap by the user equipment, includes the following steps.

At step S1021, it is determined whether all of the first transmission opportunities within a preset duration and/or of a first number overlap with a third number of measurement gaps, where the first transmission opportunities are for transmitting the scheduling request corresponding to the first logical channel through the physical uplink control channel.

At step S1022, if all of the first transmission opportunities within the preset duration and/or of the first number overlap with the third number of measurement gaps, it is determined that there is an overlap in time-domain between the physical uplink control channel transmission for the scheduling request corresponding to the first logical channel by the user equipment and the other operation of the user equipment.

In an embodiment, there may be one or more first transmission opportunities, and one or more measurement gaps. Therefore, it is possible that the first transmission opportunities overlap with the measurement gaps in part, or that all the first transmission opportunities overlap with the measurement gaps.

When a part of the first transmission opportunities overlap with the measurement gaps, there are still some first transmission opportunities that do not overlap with the measurement gaps and the scheduling request may be transmitted through the physical uplink control channel at these first transmission opportunities. Therefore, in this case, monitoring the frequency of the other cell during the measurement gap is not necessary to be suspended, which can ensure a lower delay of the operation of monitoring the frequency of the other cell at the expense of a higher delay of the service corresponding to the first logical channel to a restricted degree.

When all the first transmission opportunities overlap with the measurement gaps, monitoring the frequency of the other cell during the measurement gap is to be suspended and the scheduling request corresponding to the first logical channel is transmitted through the physical uplink control channel, so as to ensure that the scheduling request can be uploaded to the base station through the physical uplink control channel.

In an embodiment, it may be determined, for the first transmission opportunities for transmitting the scheduling request corresponding to the first logical channel through the physical uplink control channel, whether all of the first transmission opportunities within the preset duration overlap with the third number of measurement gaps, whether all of the first number of first transmission opportunities overlap with the third number of measurement gaps, and whether all of the first number of first transmission opportunities within the preset duration overlap with the third number of measurement gaps.

It should be noted that the preset duration, the first number, and the third number above-mentioned may be set as required.

Figure 13:
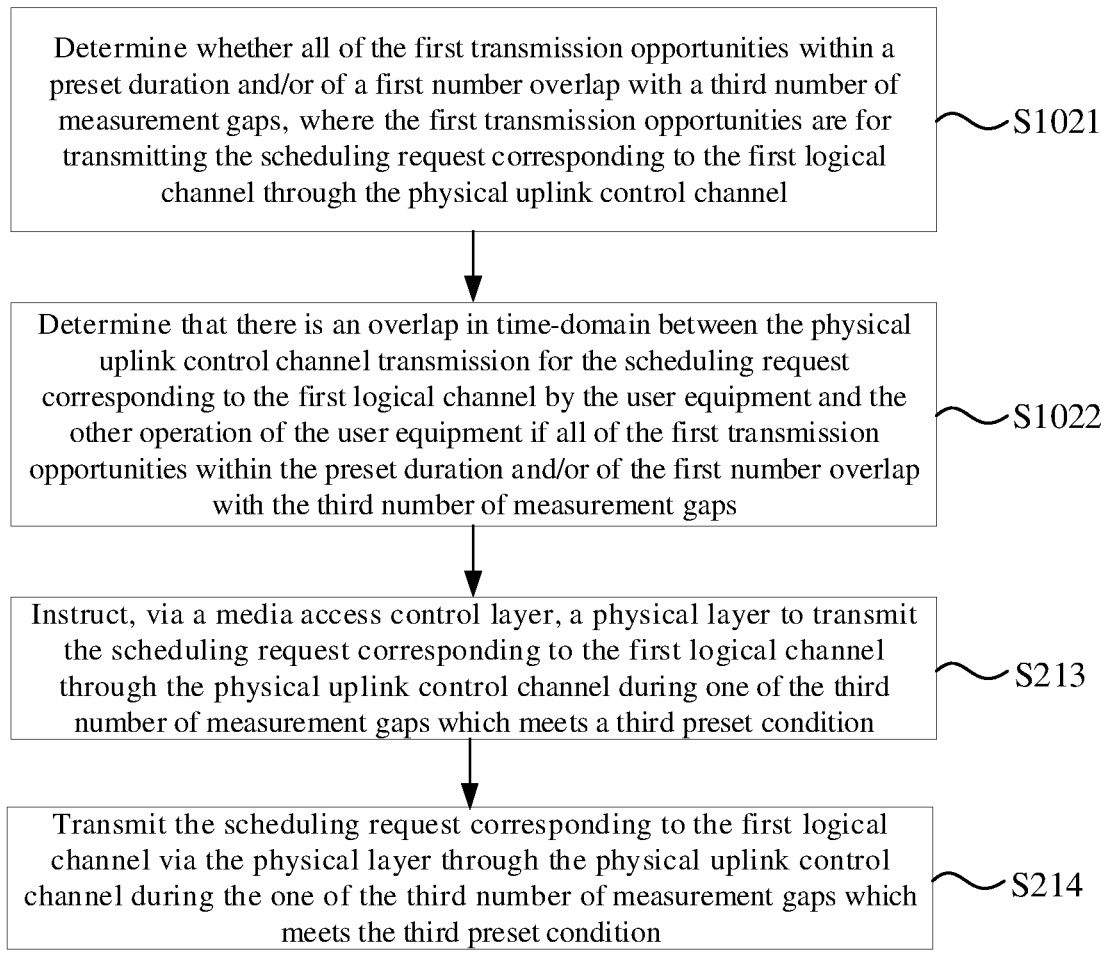
FIG. 13 is a flowchart illustrating another method of transmitting a scheduling request according to an embodiment.

FIG. 13 is a flowchart illustrating another method of transmitting a scheduling request according to an embodiment. As shown in FIG. 13, on the basis of the embodiment shown in FIG. 12, the step, that the other operation is suspended, includes the following steps.

At step S213, a physical layer is instructed, via a media access control layer, to transmit the scheduling request corresponding to the first logical channel through the physical uplink control channel during one of the third number of measurement gaps which meets a third preset condition.

At step S214, the scheduling request corresponding to the first logical channel is transmitted via the physical layer through the physical uplink control channel during the one of the third number of measurement gaps which meets the third preset condition.

In an embodiment, when determining that there is the overlap in time-domain between the physical uplink control channel transmission for the scheduling request corresponding to the first logical channel and the measurement gaps, the user equipment may indicate, via the media access control layer, the physical layer to transmit the scheduling request corresponding to the first logical channel through the physical uplink control channel during the one of the third number of measurement gaps which meets the third preset condition. The physical layer may transmit, based on the instruction from the media access control layer, the scheduling request corresponding to the first logical channel through the physical uplink control channel during the one of the third number of measurement gaps which meets the third preset condition.

It should be noted that, the media access control layer in the above cases may instruct the physical layer to transmit the scheduling request corresponding to the first logical channel through the physical uplink control channel during the one of the third number of measurement gaps which meets the third preset condition, as well as instruct the physical layer to monitor the frequency of the other cell during the measurement gaps. The physical layer may determine to transmit the scheduling request corresponding to the first logical channel through the physical uplink control channel during the one of the third number of measurement gaps which meets the third preset condition, or to monitor the frequency of the other cell during the measurement gaps.

In some embodiments, the measurement gap meeting the third preset condition is one of the measurement gaps which overlaps in time-domain with an earliest one of the first transmission opportunities.

In an embodiment, when multiple first transmission opportunities overlap with multiple measurement gaps, the scheduling request corresponding to the first logical channel may be transmitted through the physical uplink control channel during the measurement gap which meets the third preset condition.

For example, the one of the measurement gaps which overlaps in time-domain with the earliest one of the first transmission opportunities may be selected as the transmission opportunity for transmitting the scheduling request corresponding to the first logical channel through the physical uplink control channel. Accordingly, the scheduling request corresponding to the first logical channel can be transmitted through the physical uplink control channel as soon as possible, so as to ensure that the low delay required by the service corresponding to the first logical channel can be satisfied.

Figure 14:
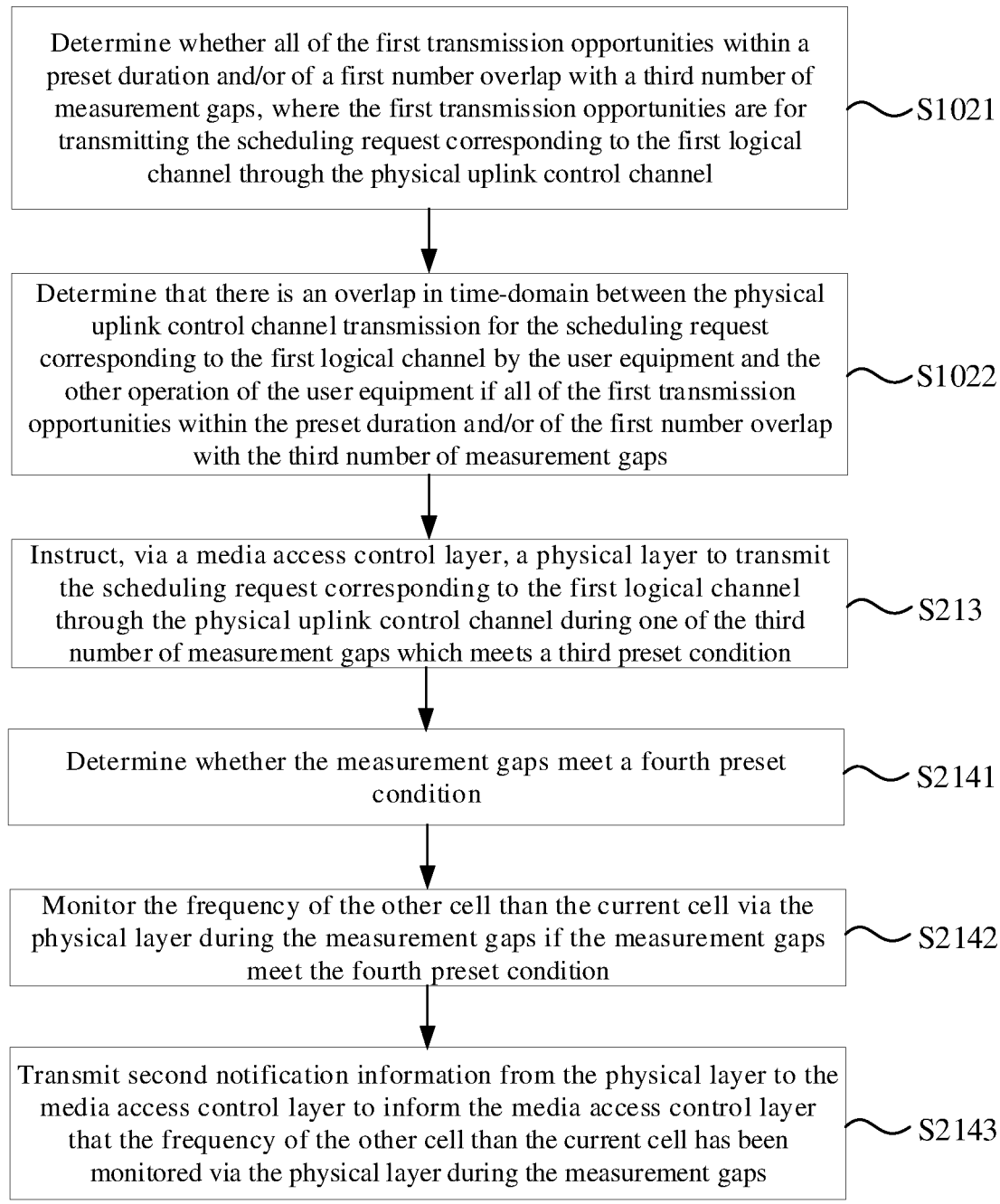
FIG. 14 is a flowchart illustrating another method of transmitting a scheduling request according to an embodiment.

FIG. 14 is a flowchart illustrating another method of transmitting a scheduling request according to an embodiment. As shown in FIG. 14, on the basis of the embodiment shown in FIG. 13, the step, that the scheduling request corresponding to the first logical channel is transmitted via the physical layer through the physical uplink control channel during the one of the third number of measurement gaps which meets the third preset condition, includes the following steps.

At step S2141, when determining that there is the overlap, it is determined whether the measurement gaps meet a fourth preset condition.

At step S2142, if the measurement gaps meet the fourth preset condition, the frequency of the other cell than the current cell is monitored via the physical layer during the measurement gaps.

At step S2143, second notification information is transmitted from the physical layer to the media access control layer to inform the media access control layer that the frequency of the other cell than the current cell has been monitored via the physical layer during the measurement gaps.

In an embodiment, when the media access control layer instructs the physical layer to transmit the scheduling request corresponding to the first logical channel through the physical uplink control channel during the one of the third number of measurement gaps which meets the third preset condition, as well as instructs the physical layer to monitor the frequency of the other cell during the measurement gaps, the physical layer may determine which operation to be performed according to the actual situation.

In some embodiments, it may be determined whether the measurement gaps meet the fourth preset condition, for example, whether the number of the measurement gaps is less than a preset number. When the measurement gaps meet the preset condition, it may be via the physical layer to monitor the frequency of the other cell during the measurement gaps, instead of transmitting the scheduling request corresponding to the first logical channel through the physical uplink control channel during the one of the measurement gaps which meets the third preset condition. Moreover, the second notification information is to be transmitted to the media access control layer, so that the media access control layer can determine which operation is performed via the physical layer and thus provide subsequent instructions.

In some embodiments, the fourth preset condition is that the number of the measurement gaps is 1.

In an embodiment, when the number of the measurement gaps is equal to 1, if the scheduling request corresponding to the first logical channel is transmitted through the physical uplink control channel during the measurement gap, no measurement gap is provided for the user equipment to monitor the frequency of the other cell, which seriously affects the operations that, for example, the user equipment switches between cells. Therefore, in this case, the measurement gap may be utilized to monitor the frequency of the other cell than the current cell instead of transmitting the scheduling request corresponding to the first logical channel through the physical uplink control channel, which ensures that the user equipment can successfully monitor the frequency of the other cell.

Figure 15:
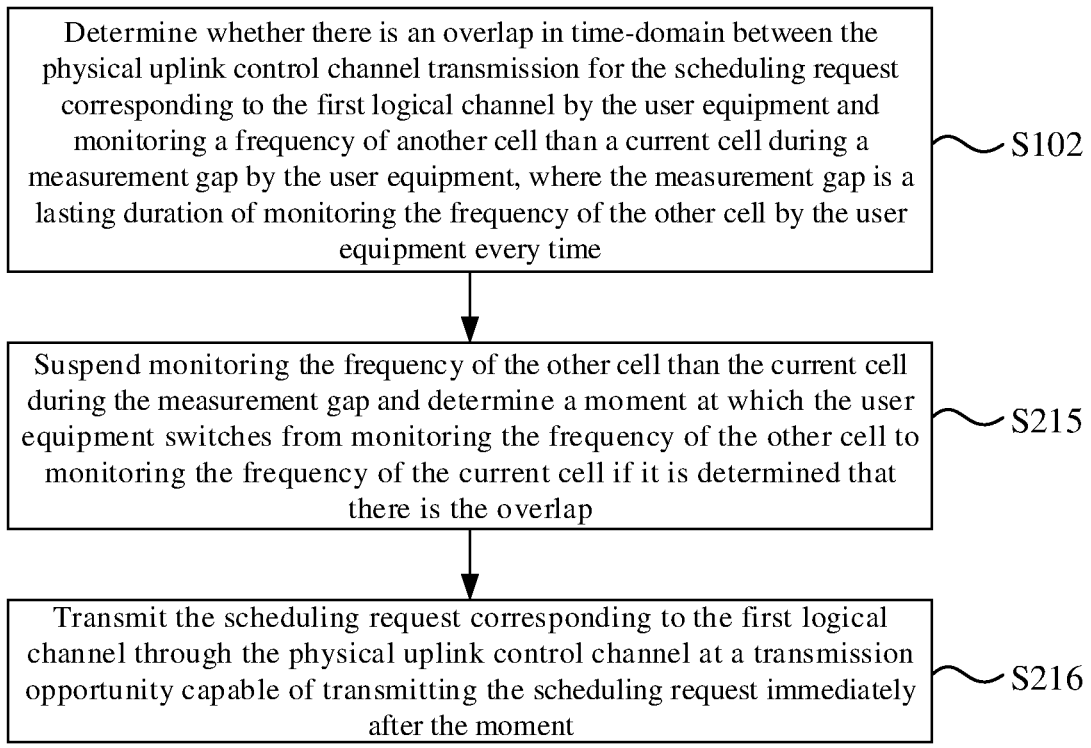
FIG. 15 is a flowchart illustrating another method of transmitting a scheduling request according to an embodiment.

FIG. 15 is a flowchart illustrating another method of transmitting a scheduling request according to an embodiment. As shown in FIG. 15, on the basis of the embodiment shown in FIG. 11, the step, that the scheduling request corresponding to the first logical channel is transmitted through the physical uplink control channel, includes the following steps.

At step S215, a moment at which the user equipment switches from monitoring the frequency of the other cell to monitoring the frequency of the current cell is determined.

At step S216, the scheduling request corresponding to the first logical channel is transmitted through the physical uplink control channel at a transmission opportunity capable of transmitting the scheduling request immediately after the moment.

In one embodiment, when the user equipment is monitoring the frequency of the other cell, it takes a period of time to switch back to the frequency of the current cell. Therefore, the moment at which the user equipment switches back to monitoring the frequency of the current cell from monitoring the frequency of the other cell may be determined firstly, and then a transmission opportunity immediately after this moment may be selected to transmit the scheduling request corresponding to the first logical channel. Thereby, the selected transmission opportunity is after the moment when the user equipment switches back to the frequency of the current cell, which ensures the selected transmission opportunity available.

Corresponding to the foregoing embodiments of the method of transmitting a scheduling request, the present disclosure also provides apparatus embodiments for transmitting a scheduling request.

Figure 16:
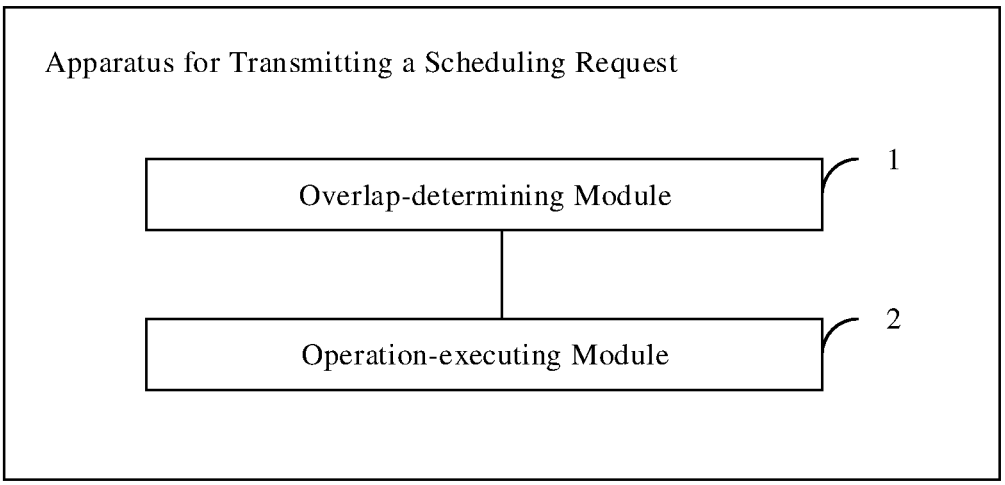
FIG. 16 is a block diagram illustrating an apparatus for transmitting a scheduling request according to an embodiment.

FIG. 16 is a block diagram illustrating an apparatus for transmitting a scheduling request according to an embodiment. The apparatus for transmitting a scheduling request shown in this embodiment is applicable to user equipment, such as a mobile phone, a tablet computer, and the like, configured for LTE communication or NR communication.

As shown in FIG. 16, the apparatus for transmitting a scheduling request includes the following modules.

An overlap-determining module 1 is configured to determine whether there is an overlap in time-domain between a physical uplink control channel transmission for a scheduling request corresponding to a first logical channel of the user equipment and another operation of the user equipment.

An operation-executing module 2 is configured to if it is determined that there is the overlap, suspend the other operation and transmit the scheduling request corresponding to the first logical channel through the physical uplink control channel.

Figure 17:
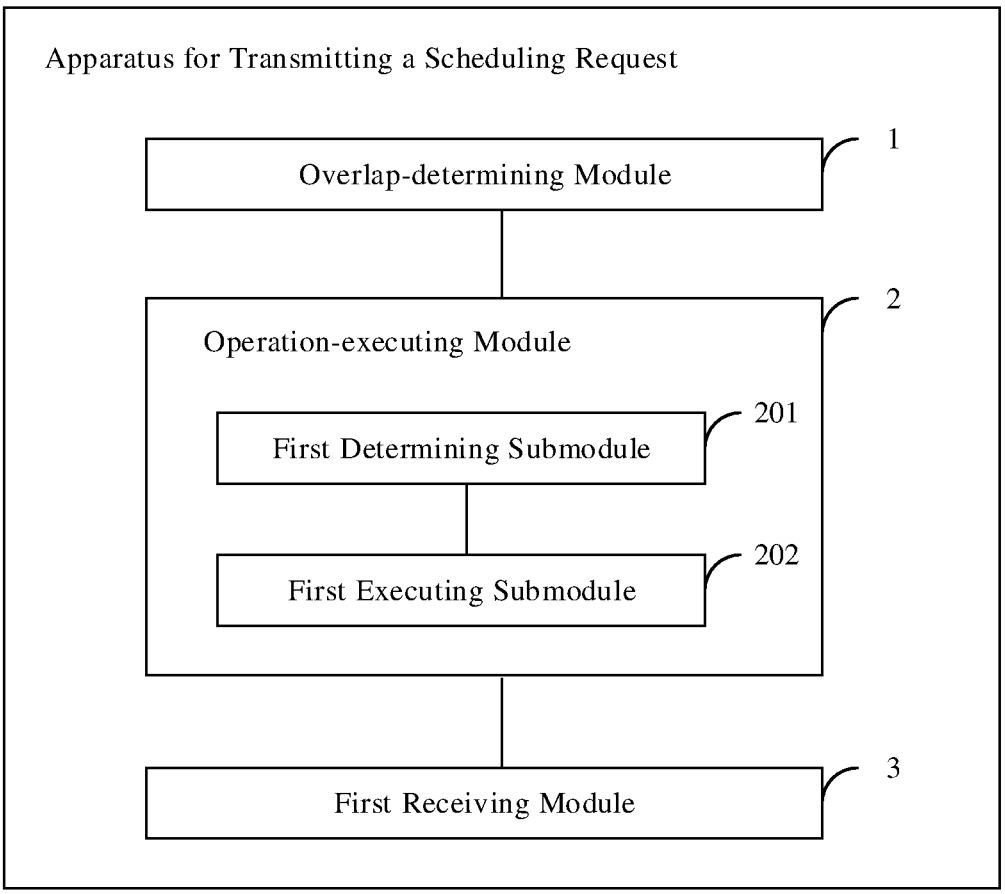
FIG. 17 is a block diagram illustrating another apparatus for transmitting a scheduling request according to an embodiment.

FIG. 17 is a block diagram illustrating another apparatus for transmitting a scheduling request according to an embodiment. As shown in FIG. 17, on the basis of the embodiment shown in FIG. 16, the apparatus further includes the following module.

A first receiving module 3 is configured to receive first configuration information sent by a base station. The first configuration information indicates a preset logical channel.

Accordingly, the operation-executing module 2 includes the following submodules.

A first determining submodule 201 is configured to if it is determined that there is the overlap, determine whether the first logical channel is the preset logical channel.

A first executing submodule 202 is configured to suspend the other operation and transmit the scheduling request corresponding to the first logical channel through the physical uplink control channel if the first logical channel is the preset logical channel, and perform the other operation if the first logical channel is not the preset logical channel.

Figure 18:
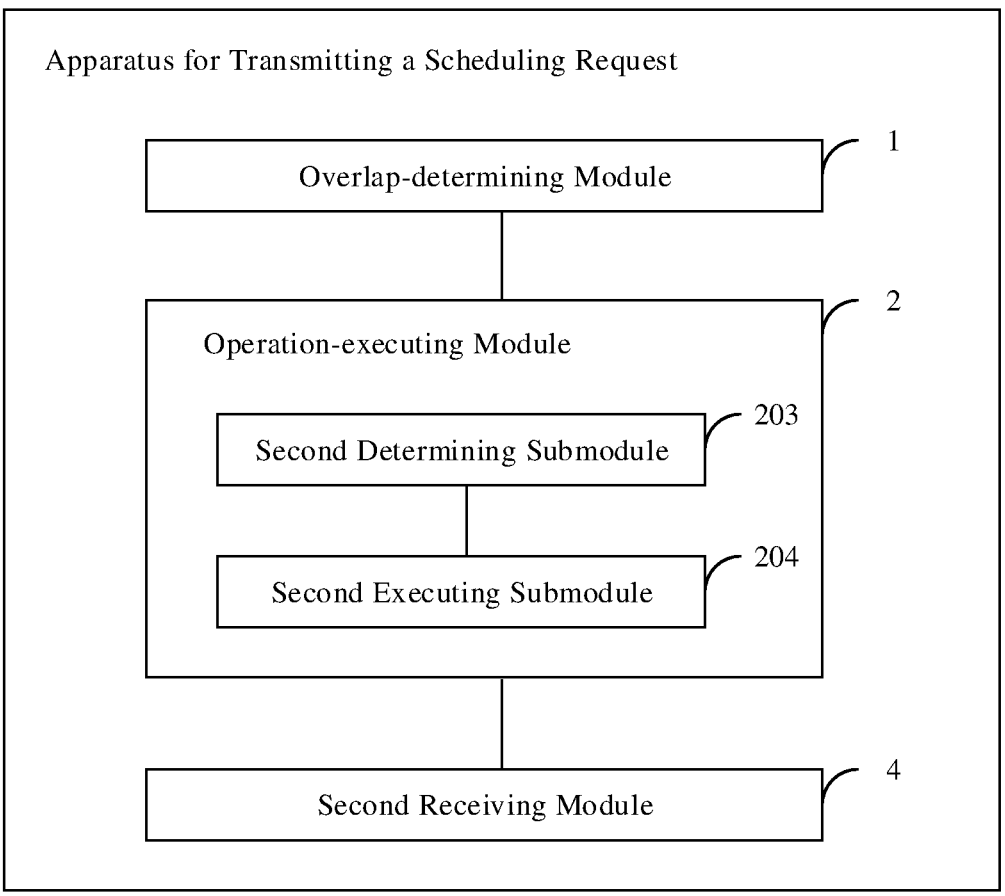
FIG. 18 is a block diagram illustrating another apparatus for transmitting a scheduling request according to an embodiment.

FIG. 18 is a block diagram illustrating another apparatus for transmitting a scheduling request according to an embodiment. As shown in FIG. 18, on the basis of the embodiment shown in FIG. 16, the apparatus further includes the following module.

A second receiving module 4 is configured to receive second configuration information sent by the base station. The second configuration information indicates whether the user equipment is configured with a preset function.

Accordingly, the operation-executing module 2 includes the following submodules.

A second determining submodule 203 is configured to determine whether the user equipment is configured with the preset function if it is determined that there is the overlap.

A second executing submodule 204 is configured to suspend the other operation and transmit the scheduling request corresponding to the first logical channel through the physical uplink control channel if the user equipment is configured with the preset function, and perform the other operation if the user equipment is not configured with the preset function.

In some embodiments, the other operation includes: data transmission, corresponding to a second logical channel, that is performed through an uplink shared channel by the user equipment; and/or monitoring, by the user equipment, a frequency of another cell than a current cell during a measurement gap. For example, the measurement gap is a lasting duration of monitoring the frequency of the other cell by the user equipment every time.

In some embodiments, the overlap-determining module is configured to determine whether there is an overlap in time-domain between the physical uplink control channel transmission for the scheduling request corresponding to the first logical channel of the user equipment and the data transmission corresponding to the second logical channel, that is performed through the uplink shared channel by the user equipment.

Figure 19:
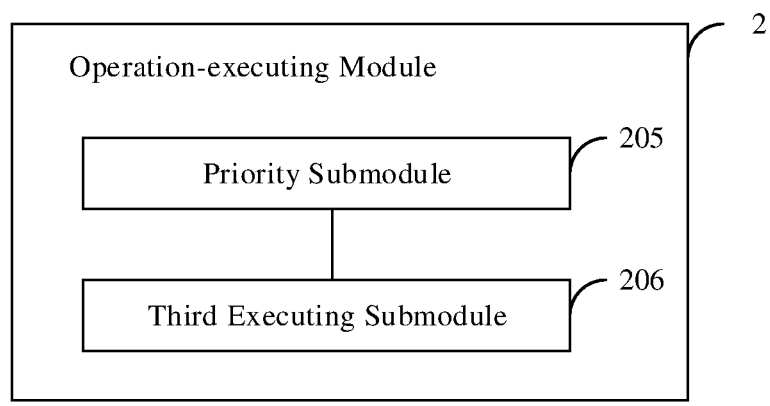
FIG. 19 is a block diagram illustrating an operation-executing module according to an embodiment.

FIG. 19 is a block diagram illustrating an operation-executing module according to an embodiment. As shown in FIG. 19, the operation-executing module 2 includes the following submodules.

A priority submodule 205 is configured to determine whether a priority of the first logical channel is higher than a priority of the second logical channel.

A third executing submodule 206 is configured to suspend the data transmission corresponding to the second logical channel through the uplink shared channel and transmit the scheduling request corresponding to the first logical channel through the physical uplink control channel if the priority of the first logical channel is higher than the priority of the second logical channel.

In some embodiments, the priority of the first logical channel is inversely proportional to a delay required by a first service corresponding to the first logical channel; and, the priority of the second logical channel is inversely proportional to a delay required by a second service corresponding to the second logical channel.

In some embodiments, the overlap-determining module is configured to determine whether all of first transmission opportunities within a preset duration and/or of a first number overlap with a second number of second transmission opportunities, where the first transmission opportunities are for transmitting the scheduling request corresponding to the first logical channel through the physical uplink control channel and the second transmission opportunities are for the data transmission corresponding to the second logical channel through the uplink shared channel.

The overlap-determining module is also configured to determine that there is an overlap in time-domain between the physical uplink control channel transmission for the scheduling request corresponding to the first logical channel of the user equipment and the other operation of the user equipment if all of the first transmission opportunities within the preset duration and/or of the first number overlap with the second number of second transmission opportunities.

In some embodiments, the third executing submodule is configured to instruct, via a media access control layer, a physical layer to transmit the scheduling request corresponding to the first logical channel through the physical uplink control channel at one of the second number of second transmission opportunities which meets a first preset condition. Accordingly, the scheduling request corresponding to the first logical channel is transmitted, via the physical layer, through the physical uplink control channel at the one of the second number of second transmission opportunities which meets the first preset condition.

In some embodiments, the third executing submodule is configured to instruct, via the media access control layer, the physical layer to transmit the scheduling request corresponding to the first logical channel through the physical uplink control channel at the one of the second number of second transmission opportunities which meets the first preset condition, instead of instructing the physical layer to perform the data transmission corresponding to the second logical channel through the uplink shared channel at the one of the second number of second transmission opportunities which meets the first preset condition.

In some embodiments, the one of the second transmission opportunities which meets the first preset condition includes: one of the second transmission opportunities which corresponds to a second logical channel with a lowest priority; or one of the second transmission opportunities which overlaps in time-domain with an earliest one of the first transmission opportunities.

Figure 20:
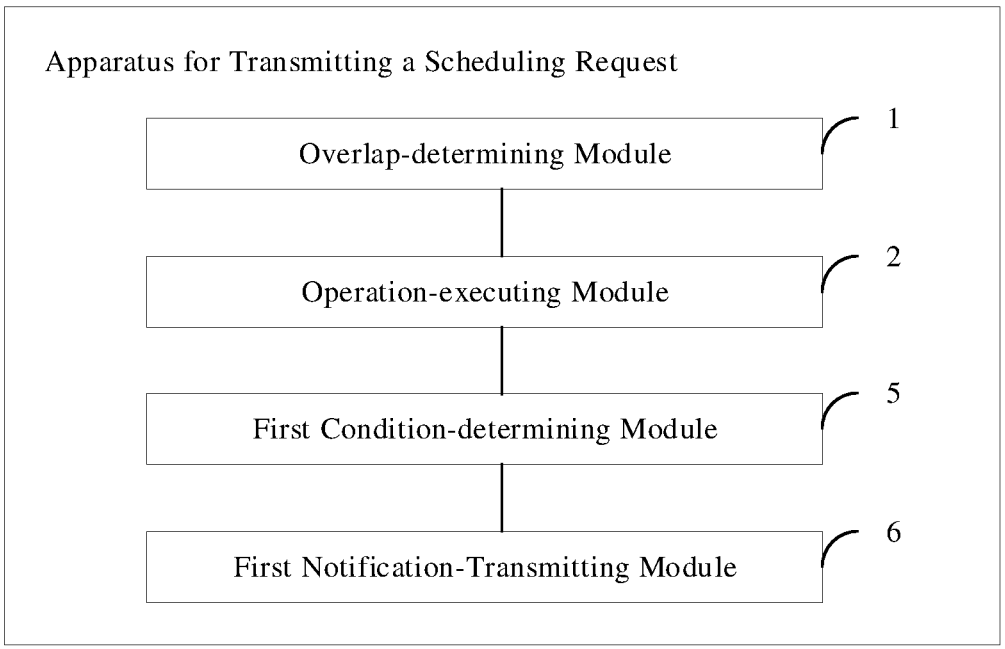
FIG. 20 is a block diagram illustrating another apparatus for transmitting a scheduling request according to an embodiment.

FIG. 20 is a block diagram illustrating another apparatus for transmitting a scheduling request according to an embodiment. As shown in FIG. 20, the apparatus further includes the following module.

A first condition-determining module 5 is configured to determine whether the second transmission opportunities meet a second preset condition if it is determined that there is the overlap.

Accordingly, the operation-executing module 2 is further configured to perform the data transmission corresponding to the second logical channel via the physical layer through the uplink shared channel at the second transmission opportunities if the second transmission opportunities meet the second preset condition.

A first notification-transmitting module 6 is configured to transmit, via the physical layer, first notification information to the media access control layer. The first notification information inform the media access control layer that the data transmission corresponding to the second logical channel has been performed via the physical layer through the uplink shared channel at the second transmission opportunities.

In some embodiments, the second preset condition is that the number of the second transmission opportunities is equal to 1.

Figure 21:
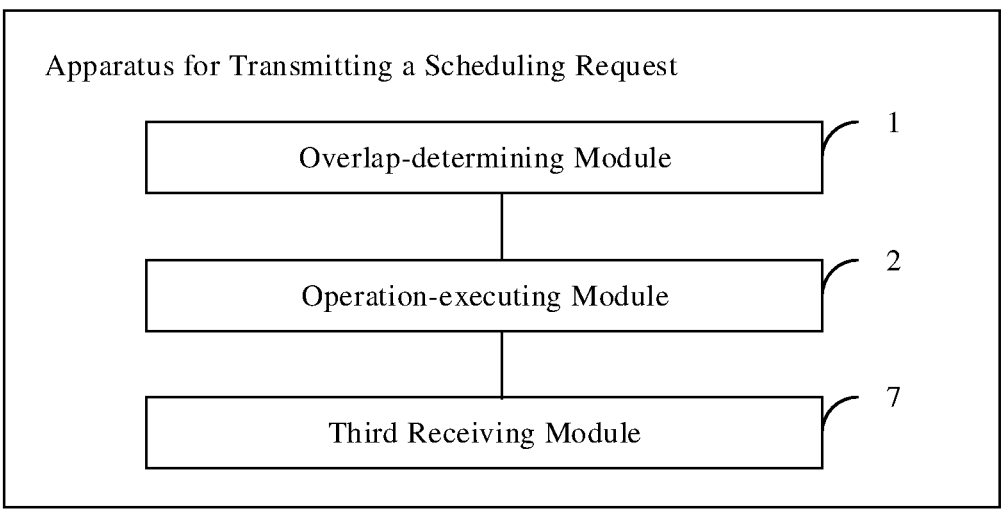
FIG. 21 is a block diagram illustrating another apparatus for transmitting a scheduling request according to an embodiment.

FIG. 21 is a block diagram illustrating another apparatus for transmitting a scheduling request according to an embodiment. As shown in FIG. 21, the apparatus further includes the following module.

A third receiving module 7 is configured to receive third configuration information sent by the base station and determine the second logical channel based on the third configuration information.

In some embodiments, the overlap-determining module is configured to determine whether there is an overlap in time-domain between the physical uplink control channel transmission for the scheduling request corresponding to the first logical channel of the user equipment and monitoring frequency of the other cell than a current cell during a measurement gap by the user equipment. For example, the measurement gap is a lasting duration of monitoring the frequency of the other cell by the user equipment every time.

In some embodiments, the operation-executing module is configured to suspend monitoring the frequency of the other cell than the current cell during the measurement gap, and transmit the scheduling request corresponding to the first logical channel through the physical uplink control channel.

In some embodiments, the overlap-determining module is configured to determine whether all of the first transmission opportunities within a preset duration and/or of a first number overlap with a third number of measurement gaps, where the first transmission opportunities are for transmitting the scheduling request corresponding to the first logical channel through the physical uplink control channel.

The overlap-determining module is also configured to determine that there is an overlap in time-domain between the physical uplink control channel transmission for the scheduling request corresponding to the first logical channel of the user equipment and the other operation of the user equipment if all of the first transmission opportunities within the preset duration and/or of the first number overlap with the third number of measurement gaps.

In some embodiments, the operation-executing module is configured to instruct, via the media access control layer, the physical layer to transmit the scheduling request corresponding to the first logical channel through the physical uplink control channel at one of the third number of measurement gaps which meets a third preset condition.

Accordingly, the scheduling request corresponding to the first logical channel is transmitted, via the physical layer, through the physical uplink control channel during the one of the third number of measurement gaps which meets the third preset condition.

In some embodiments, the measurement gap meeting the third preset condition is one of the measurement gaps which overlaps in time-domain with an earliest one of the first transmission opportunities.

Figure 22:
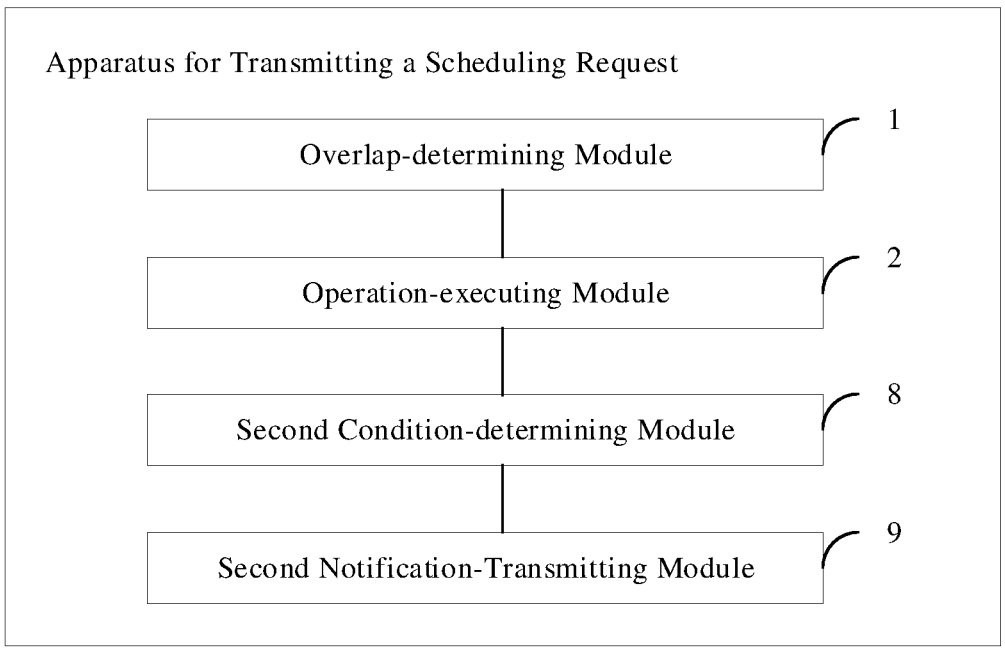
FIG. 22 is a block diagram illustrating another apparatus for transmitting a scheduling request according to an embodiment.

FIG. 22 is a block diagram illustrating another apparatus for transmitting a scheduling request according to an embodiment. As shown in FIG. 22, the apparatus further includes the following modules.

A second condition-determining module 8 is configured to determine whether the measurement gaps meet a fourth preset condition if it is determined that there is the overlap.

Accordingly, the operation-executing module is further configured to monitor the frequency of the other cell than the current cell via the physical layer during the measurement gaps if the measurement gaps meet the fourth preset condition.

A second notification-transmitting module 9 is configured to transmit, via the physical layer, second notification information to the media access control layer. The second notification information informs the media access control layer that the frequency of the other cell than the current cell has been monitored via the physical layer during the measurement gaps.

In some embodiments, the fourth preset condition is that the number of the measurement gaps is 1.

Figure 23:
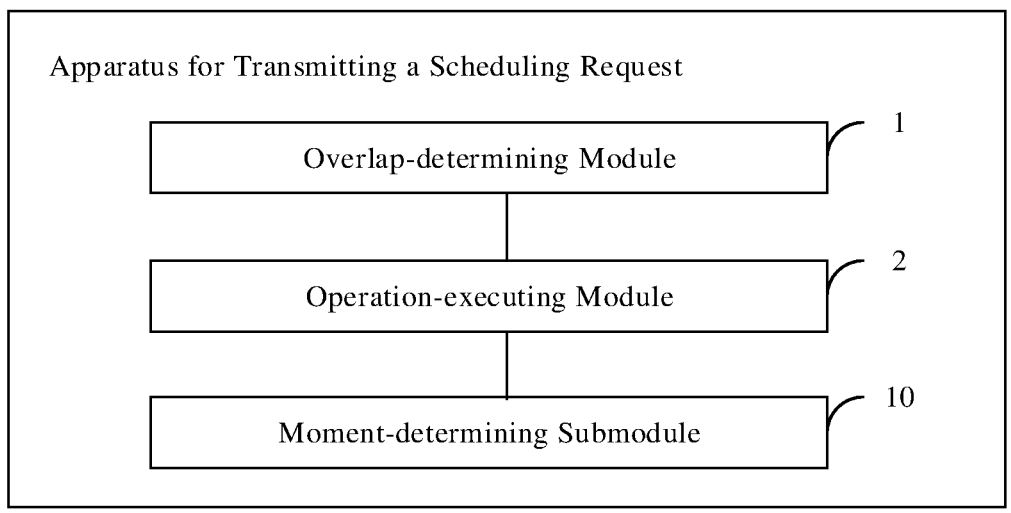
FIG. 23 is a block diagram illustrating another apparatus for transmitting a scheduling request according to an embodiment.

FIG. 23 is a block diagram illustrating another apparatus for transmitting a scheduling request according to an embodiment. As shown in FIG. 23, the operation-executing module includes the following submodule.

A moment-determining submodule 10 is configured to determine a moment at which the user equipment switches from monitoring the frequency of the other cell to monitoring the frequency of the current cell.

For example, the operation-executing module 2 is configured to transmit the scheduling request corresponding to the first logical channel through the physical uplink control channel at a transmission opportunity capable of transmitting the scheduling request immediately after the moment.

Regarding the apparatus in the above embodiments, the specific manner in which each module performs its operation has been described in detail in the embodiments of the related method, and will not be repeated here.

Since the apparatus embodiments correspond to the method embodiments, reference may be made to the description of related parts of the method embodiments. The apparatus embodiments described above are merely illustrative, wherein the modules described as separate components may or may not be physically separated, and the components displayed as modules may or may not be physical units, that is, may be located in one place or distributed to multiple units in a network. Some or all of the modules may be selected according to actual needs to achieve the objectives of the implementations of the embodiments. It can be understood and implemented by those of ordinary skill in the art without any creative effort.

An embodiment of the present disclosure also provides an electronic device, which is applicable to user equipment, and the electronic device includes: a processor; and a memory for storing instructions executable by the processor. The processor is configured to: determine whether there is an overlap in time-domain between a physical uplink control channel transmission for a scheduling request corresponding to a first logical channel of the user equipment and another operation of the user equipment; and transmit, in response to that there is the overlap, the scheduling request corresponding to the first logical channel through the physical uplink control channel and suspending the other operation.

An embodiment of the present disclosure also provides a computer-readable storage medium on which a computer program is stored, which is applicable to user equipment, and when the program is executed by a processor, causes the processor to implement the following steps: determining whether there is an overlap in time-domain between a physical uplink control channel transmission for a scheduling request corresponding to a first logical channel of the user equipment and another operation of the user equipment; and transmitting, in response to that there is the overlap, the scheduling request corresponding to the first logical channel through the physical uplink control channel and suspending the other operation.

Figure 24:
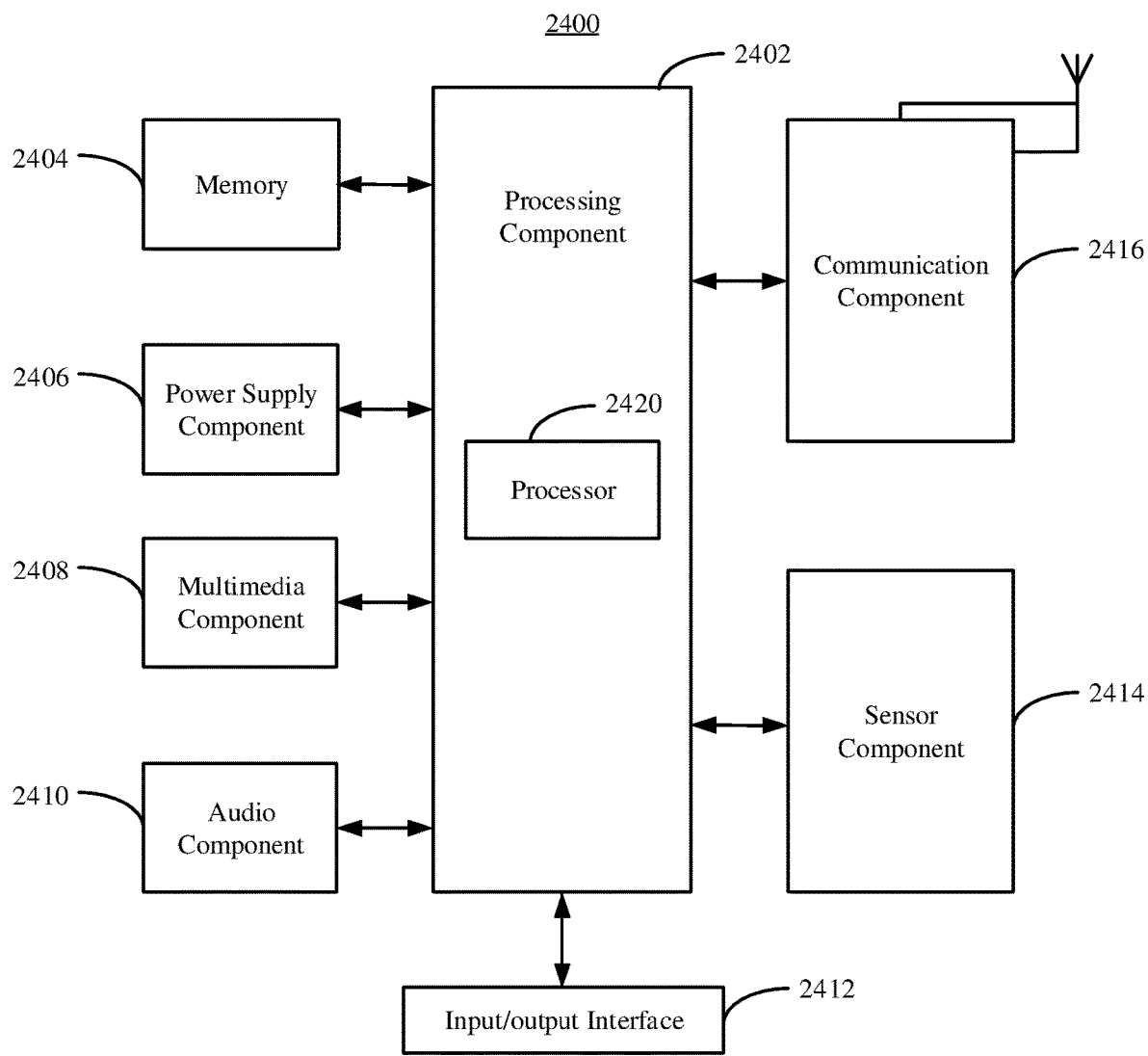
FIG. 24 is a block diagram illustrating a device applicable to transmitting a scheduling request according to an embodiment.

FIG. 24 is a block diagram showing a device 2400 applicable to transmitting a scheduling request according to an embodiment. For example, the device 2400 may be a mobile phone, a computer, a digital broadcasting terminal, a messaging device, a game console, a tablet device, a medical device, a fitness device, a personal digital assistant, and the like.

As shown in FIG. 24, the device 2400 may include one or more of the following components: a processing component 2402, a memory 2404, a power supply component 2406, a multimedia component 2408, an audio component 2410, an input/output (I/O) interface 2412, a sensor component 2414, and a communication component 2416.

The processing component 2402 generally controls overall operations of the device 2400, such as operations associated with display, phone calls, data communications, camera operations, and recording operations. The processing element 2402 may include one or more processors 2420 to execute instructions to complete all or part of the steps of the above method. In addition, the processing component 2402 may include one or more modules which facilitate the interaction between the processing component 2402 and other components. For example, the processing component 2402 may include a multimedia module to facilitate the interaction between the multimedia component 2408 and the processing component 2402.

The memory 2404 is configured to store various types of data to support the operation of the device 2400. Examples of such data include instructions for any application or method operating on the device 2400, contact data, phone book data, messages, pictures, videos, and the like. The memory 2404 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 2406 supplies power for different components of the device 2400. The power supply component 2406 may include a power supply management system, one or more power supplies, and other components associated with generating, managing and distributing power for the device 2400.

The multimedia component 2408 includes a screen providing an output interface between the device 2400 and a user. In some embodiments, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a lasting time and a pressure associated with the touch or swipe. In some embodiments, the multimedia component 2408 may include a front camera and/or a rear camera. The front camera and/or rear camera may receive external multimedia data when the device 2400 is in an operating mode, such as a photographing mode or a video mode. Each front camera and rear camera may be a fixed optical lens system or have focal length and optical zooming capability.

The audio component 2410 is configured to output and/or input an audio signal. For example, the audio component 2410 includes a microphone (MIC). When the device 2400 is in an operating mode, such as a call mode, a record mode and a voice recognition mode, the microphone is configured to receive an external audio signal. The received audio signal may be further stored in the memory 2404 or sent via the communication component 2416. In some embodiments, the audio component 2410 further includes a speaker for outputting an audio signal.

The I/O interface 2412 provides an interface between the processing component 2402 and a peripheral interface module. The above peripheral interface module may be a keyboard, a click wheel, buttons, or the like. These buttons may include but not limited to, a home button, a volume button, a start button and a lock button.

The sensor component 2414 includes one or more sensors to provide status assessments of various aspects for the device 2400. For example, the sensor component 2414 can detect an open/closed state of the device 2400 and a relative positioning of components such as the display and keypad of the device 2400, and the sensor component 2414 can also detect a change in position of the device 2400 or a component of the device 2400, the presence or absence of user contact with the device 2400, orientation or acceleration/deceleration of the device 2400, and temperature change of the device 2400. The sensor component 2414 may include a proximity sensor configured to detect the presence of nearby objects without any physical contact. The sensor component 2414 may also include a light sensor, such as a Complementary Metal-Oxide-Semiconductor (CMOS) or Charged Coupled Device (CCD) image sensor, for use in imaging applications. In some embodiments, the sensor component 2414 may further include an acceleration sensor, a gyroscope sensor, a magnetic sensor, a pressure sensor, or a temperature sensor.

The communication component 2416 is configured to facilitate wired or wireless communication between the device 2400 and other devices. The device 2400 may access a wireless network based on a communication standard, such as Wi-Fi, 4G or 5G, or a combination thereof. In an embodiment, the communication component 2416 receives broadcast signals or broadcast related information from an external broadcast management system via a broadcast channel In an embodiment, the communication component 2416 also includes a near field communication (NFC) module to facilitate short-range communication. For example, the NFC module can be implemented based on a radio frequency identification (RFID) technology, an infrared data association (IrDA) technology, an ultra-wideband (UWB) technology, a Bluetooth® (BT) technology and other technologies.

In an embodiment, the device 2400 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components for performing the method for transmitting a scheduling request described in any of the above embodiments.

In an embodiment, there is also provided a non-transitory computer-readable storage medium including instructions, such as the memory 2404 including instructions executable by the processor 2420 of the device 2400 to implement the above methods. For example, the non-transitory computer-readable storage medium may be a ROM, a random access memory (RAM), a CD-ROM, a magnetic tape, a floppy disk, and an optical data storage device.

Figure 25:
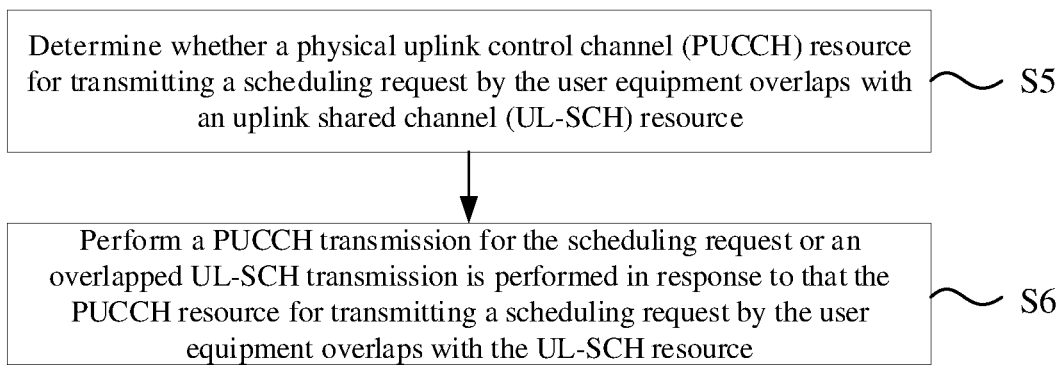
FIG. 25 is a flowchart illustrating a method of transmitting a scheduling request according to an embodiment.

In an embodiment, there is provided a method of transmitting a scheduling request, which is applicable to user equipment, and as shown in FIG. 25, the method includes the following steps.

At step S5, it is determined whether a physical uplink control channel (PUCCH) resource for transmitting a scheduling request by the user equipment overlaps with an uplink shared channel (UL-SCH) resource.

At step S6, in response to that the PUCCH resource for transmitting a scheduling request by the user equipment overlaps with the UL-SCH resource, a PUCCH transmission for the scheduling request or an overlapped UL-SCH transmission is performed.

In some embodiments, the method further includes: receiving second configuration information indicating whether the user equipment is configured with a preset function.

In some embodiments, the step S6 includes: in response to determining that the PUCCH resource for transmitting the scheduling request by the user equipment overlaps with the UL-SCH and the user equipment is configured with the preset function, the PUCCH transmission for the scheduling request is performed with suspending the overlapped UL-SCH transmission.

In some embodiments, the step S6 includes: in response to determining that the PUCCH resource for transmitting a scheduling request by the user equipment overlaps with the UL-SCH resource and the user equipment is not configured with the preset function, the overlapped UL-SCH transmission is performed with suspending the PUCCH transmission for the scheduling request.

Figure 26:
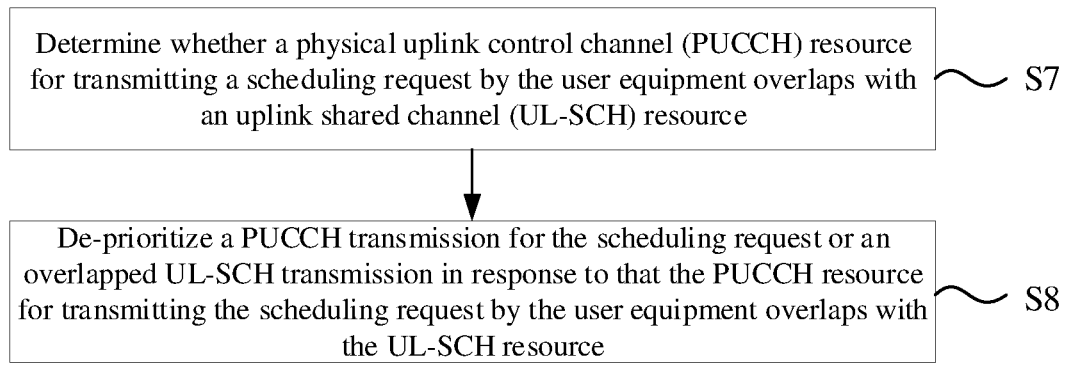
FIG. 26 is a flowchart illustrating a method of transmitting a scheduling request according to an embodiment.

In an embodiment, there is provided a method of transmitting a scheduling request, which is applicable to user equipment, and as shown in FIG. 26, the method includes the following steps.

At step S7, it is determined whether a physical uplink control channel (PUCCH) resource for transmitting a scheduling request by the user equipment overlaps with an uplink shared channel (UL-SCH) resource.

At step S8, in response to that the PUCCH resource for transmitting the scheduling request by the user equipment overlaps with the UL-SCH resource, a PUCCH transmission for the scheduling request or an overlapped UL-SCH transmission is de-prioritized.

In some embodiments, the method further includes: receiving second configuration information indicating whether the user equipment is configured with a preset function.

In some embodiments, the step S8 includes: in response to determining that the PUCCH resource for transmitting the scheduling request by the user equipment overlaps with the UL-SCH resource and the user equipment is configured with the preset function, the overlapped UL-SCH transmission is de-prioritized.

In some embodiments, the step S8 includes: in response to determining that the PUCCH resource for transmitting the scheduling request by the user equipment overlaps with the UL-SCH resource and the user equipment is not configured with the preset function, the PUCCH for transmitting a scheduling request is de-prioritized.

It should be noted that the relational terms such as "first" and "second" used herein are merely intended to distinguish one entity or operation from another entity or operation rather than to require or imply any such actual relationship or order existing between these entities or operations. Also, the term "including", "containing", or any variation thereof is intended to encompass non-exclusive inclusion, so that a process, method, article, or device including a series of elements includes not only those elements but also other elements not listed explicitly or those elements inherent to such a process, method, article, or device. Without more limitations, an element defined by the statement "including a . . . " shall not be precluded to include additional same elements present in a process, method, article or device including the element.

Other implementations of the present disclosure will be apparent to those skilled in the art after considering the disclosure. The present application is intended to cover any variations, uses, or adaptations of the present disclosure which are in accordance with the general principles of the present disclosure and include common knowledge or conventional technical means in the art that are not disclosed in the present disclosure. The specification and embodiments therein are only illustrative, and the scope and spirit of the present disclosure are to be indicated by appended claims.

It should be understood that the present disclosure is not limited to the above described structures shown in the drawings, and various modifications and changes can be made to the present disclosure without departing from the scope thereof. The scope of the present disclosure is to be limited only by the appended claims.

The invention claimed is:

1. A method of transmitting a scheduling request, applied to user equipment, comprising:
    determining whether all of first transmission opportunities within a preset duration and/or of a first number overlap with a second number of second transmission opportunities, wherein the first transmission opportunities are for transmitting a scheduling request corresponding to a first logical channel through a physical uplink control channel and the second transmission opportunities are for a second operation of the user equipment, the second operation comprising a data transmission that corresponds to a second logical channel and is performed through an uplink shared channel by the user equipment;
    instructing, via a media access control layer, in response to that there is the overlap, a physical layer to transmit the scheduling request corresponding to the first logical channel through the physical uplink control channel at one of the second number of second transmission opportunities which meets a first preset condition, and to perform the data transmission corresponding to the second logical channel through the uplink shared channel at the one of the second number of second transmission opportunities which meets the first preset condition;
    determining whether the second transmission opportunities meet a second preset condition;
    performing, via the physical layer, in response to that the second transmission opportunities meet the second preset condition, the data transmission corresponding to the second logical channel through the uplink shared channel at the second transmission opportunities; and transmitting, from the physical layer to the media access control layer, first notification information to inform the media access control layer that the data transmission corresponding to the second logical channel has been performed via the physical layer through the uplink shared channel at the second transmission opportunities; and transmitting, via the physical layer, in response to that the second transmission opportunities do not meet the second preset condition, the scheduling request corresponding to the first logical channel through the physical uplink control channel at the one of the second number of second transmission opportunities which meets the first preset condition.

2. The method according to claim 1, further comprising:
receiving, before determining whether there is the overlap, second configuration information which is sent by a base station and indicates whether the user equipment is configured with a preset function;
determining, in response to that there is the overlap, whether the user equipment is configured with the preset function;
performing the instructing, in response to that the user equipment is configured with the preset function; and
performing, in response to that the user equipment is not configured with the preset function, the second operation.

3. The method according to claim 1, wherein the second operation further comprises:
monitoring, by the user equipment, a frequency of a second cell other than a current cell during a measurement gap, wherein the measurement gap is a lasting duration of monitoring the frequency of the second cell by the user equipment every time.

4. The method according to claim 1, further comprising:
determining whether a priority of the first logical channel is higher than a priority of the second logical channel; and
performing the instructing, in response to that the priority of the first logical channel is higher than the priority of the second logical channel.

5. The method according to claim 1, wherein
the second preset condition is that a number of the second transmission opportunities is equal to 1.

6. The method according to claim 1, further comprising:
receiving, before determining whether there is the overlap, configuration information sent by a base station; and
determining the second logical channel based on the configuration information.

7. The method according to claim 1, further comprising:
receiving, before determining whether there is the overlap, configuration information which is sent by a base station and indicates a preset logical channel;
determining, in response to that there is the overlap, whether the first logical channel is the preset logical channel;
performing the instructing, in response to that the first logical channel is the preset logical channel; and
performing the second operation, in response to that the first logical channel is not the preset logical channel.

8. A method of transmitting a scheduling request, applied to user equipment, comprising:

determining whether all of first transmission opportunities within a preset duration and/or of a first number overlap with a third number of measurement gaps, wherein the first transmission opportunities are for transmitting a scheduling request corresponding to a first logical channel through a physical uplink control channel, and wherein a measurement gap is a lasting duration of monitoring a frequency of a second cell by the user equipment every time;

in response to that there is the overlap,
instructing, via a media access control layer, a physical layer to transmit the scheduling request corresponding to the first logical channel through the physical uplink control channel during one of the third number of measurement gaps which meets a first preset condition, and to monitor the frequency of the second cell other than the current cell during the measurement gaps;

determining whether the measurement gaps meet a second preset condition;

monitoring, in response to that the measurement gaps meet the second preset condition, the frequency of the second cell other than the current cell via the physical layer during the measurement gaps; and transmitting, from the physical layer to the media access control layer, second notification information to inform the media access control layer that the frequency of the second cell other than the current cell has been monitored via the physical layer during the measurement gaps; and transmitting, in response to that the measurement gaps do not meet the second preset condition, the scheduling request corresponding to the first logical channel through the physical uplink control channel during the one of the third number of measurement gaps.

9. The method according to claim 8, wherein
the second preset condition is that a number of the measurement gaps is 1.

10. The method according to claim 8, further comprising:
receiving, before determining whether there is the overlap, configuration information which is sent by a base station and indicates a preset logical channel;
determining, in response to that there is the overlap, whether the first logical channel is the preset logical channel;
performing the instructing, in response to that the first logical channel is the preset logical channel; and
monitoring, in response to that the first logical channel is not the preset logical channel, the frequency of the second cell other than the current cell during the measurement gaps.

11. The method according to claim 8, further comprising:
receiving, before determining whether there is the overlap, configuration information which is sent by a base station and indicates whether the user equipment is configured with a preset function;
determining, in response to that there is the overlap, whether the user equipment is configured with the preset function;
performing the instructing, in response to that the user equipment is configured with the preset function; and
monitoring, in response to that the user equipment is not configured with the preset function, the frequency of the second cell other than the current cell during the measurement gaps.

* * * * *